US011740766B2

(12) United States Patent
Takakuwa et al.

(10) Patent No.: US 11,740,766 B2
(45) Date of Patent: Aug. 29, 2023

(54) INFORMATION PROCESSING SYSTEM, INFORMATION PROCESSING METHOD, AND COMPUTER PROGRAM

(71) Applicant: GREE, Inc., Tokyo (JP)

(72) Inventors: Soichiro Takakuwa, Tokyo (JP); Kazunori Yamamoto, Kanagawa (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/553,793

(22) Filed: Dec. 17, 2021

(65) Prior Publication Data

US 2022/0197447 A1 Jun. 23, 2022

(30) Foreign Application Priority Data

Dec. 18, 2020 (JP) .............................. JP2020-210402

(51) Int. Cl.
*G06F 3/0482* (2013.01)
*G06F 3/14* (2006.01)

(52) U.S. Cl.
CPC .............. *G06F 3/0482* (2013.01); *G06F 3/14* (2013.01)

(58) Field of Classification Search
CPC ................................. G06F 3/0482; G06F 3/14
See application file for complete search history.

(56) References Cited

U.S. PATENT DOCUMENTS

| 2011/0107220 | A1* | 5/2011 | Perlman | ................ | H04L 65/401 |
| | | | | | 715/720 |
| 2014/0195675 | A1* | 7/2014 | Silver | ................. | H04L 65/1083 |
| | | | | | 709/224 |
| 2015/0334075 | A1* | 11/2015 | Wang | ..................... | H04L 51/52 |
| | | | | | 715/752 |
| 2020/0034033 | A1* | 1/2020 | Chaudhri | .............. | H04L 51/063 |
| 2021/0051034 | A1* | 2/2021 | Jonas | ................. | H04L 12/1822 |

FOREIGN PATENT DOCUMENTS

JP 2015-184689 A 10/2015

* cited by examiner

*Primary Examiner* — Cao H Nguyen
(74) *Attorney, Agent, or Firm* — XSENSUS LLP

(57) ABSTRACT

An information processing system distributes a video and includes processing circuitry configured to accept selection of a first object from a first information processing terminal; transmit, in accordance with the selection, a predetermined notification to a second information processing terminal associated with the first object; receive a response to the predetermined notification from the second information processing terminal; determine a state of a first screen displayed on the first information processing terminal; and decide, based on the determined state of the first screen, a second screen to be displayed on the second information processing terminal.

17 Claims, 17 Drawing Sheets

| STATE OF FIRST USER | | SECOND SCREEN |
|---|---|---|
| FIRST STATE | DISTRIBUTING VIDEO A | SCREEN FOR VIEWING VIDEO A |
| SECOND STATE | VIEWING VIDEO B | SCREEN FOR VIEWING VIDEO B |
| THIRD STATE | OTHERS | SCREEN FOR CHATTING WITH FIRST USER |

| STATE OF SECOND USER | | | ONLINE/OFFLINE |
|---|---|---|---|
| FOURTH STATE | | APPEARING IN VIDEO | ONLINE |
| FIFTH STATE | | VIEWING VIDEO | ONLINE |
| SIXTH STATE | SEVENTH STATE | OTHERS | ONLINE |
| | EIGHTH STATE | OTHERS | OFFLINE |

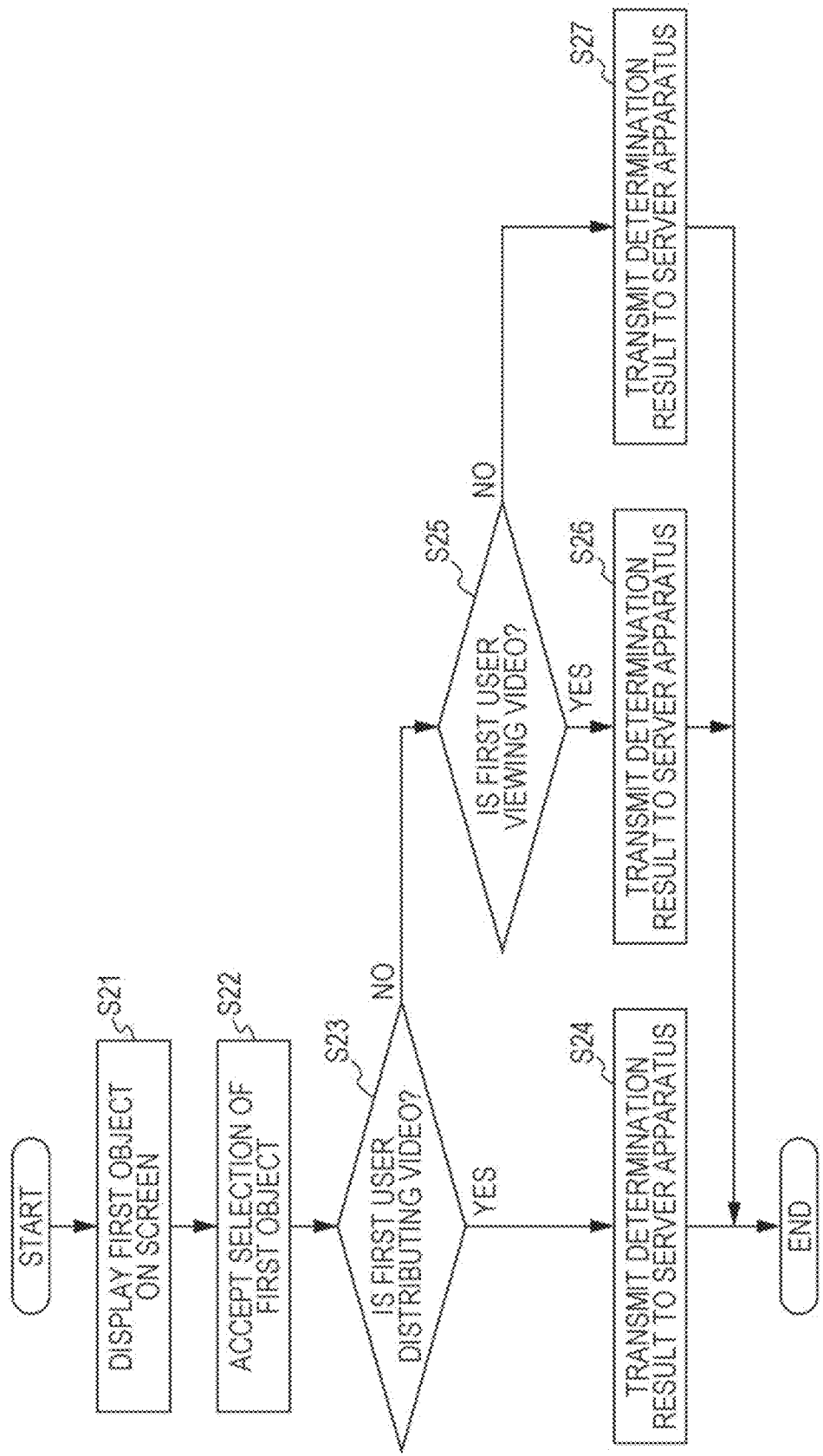

INFORMATION PROCESSING SYSTEM, INFORMATION PROCESSING METHOD, AND COMPUTER PROGRAM

CROSS-REFERENCE TO RELATED APPLICATION

This application claims priority to JP 2020-210402, filed Dec. 18, 2020, the contents of which are hereby incorporated by reference in their entirety.

BACKGROUND

Conventionally, there is an information processing system that generates animation of a character object on the basis of motion of an actor and that distributes a video including the animation of the character object.

SUMMARY

In accordance with the present application, an information processing system distributes a video and includes processing circuitry configured to accept selection of a first object from a first information processing terminal; transmit, in accordance with the selection, a predetermined notification to a second information processing terminal associated with the first object; receive a response to the predetermined notification from the second information processing terminal; determine a state of a first screen displayed on the first information processing terminal; and decide, based on the determined state of the first screen, a second screen to be displayed on the second information processing terminal.

BRIEF DESCRIPTION OF THE DRAWINGS

FIG. 33 is a flowchart illustrating an example of a process of an information processing method for the first information processing terminal according to an embodiment of the present disclosure;

DETAILED DESCRIPTION OF THE DRAWINGS

Figure 1:
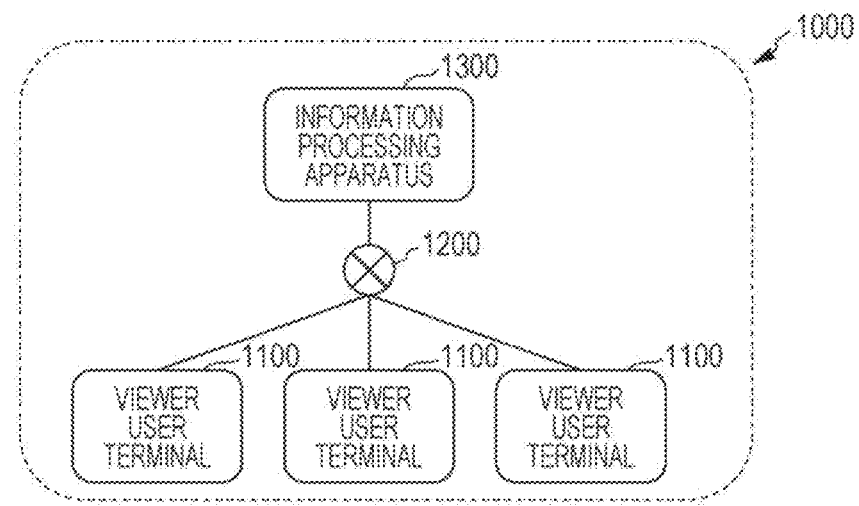
FIG. 1 is a system configuration diagram illustrating an example of an information processing system according to an embodiment of the present disclosure.

The inventors have developed the technology described in the present disclosure have to increase a distributer's willingness to distribute and/or a viewer's willingness to view content.

An information processing system according to an embodiment of the present disclosure is an information processing system that distributes a video and includes one or more computer processors. The one or more computer processors include an acceptance unit that accepts selection of a first object from a first information processing terminal; a transmission unit that transmits, in accordance with the selection accepted by the acceptance unit, a predetermined notification to a second information processing terminal associated with the first object; a reception unit that receives a response to the predetermined notification from the second information processing terminal; a first determination unit that makes a determination on a state of a first user related to the first information processing terminal; and a decision unit that decides on, based on a result of the determination made by the first determination unit, a second screen to be displayed on the second information processing terminal.

The first determination unit may determine which of a first state of appearing in a video, a second state of viewing a video on a main screen, and a third state of neither appearing in a video nor viewing a video on the main screen, the state of the first user related to the first information processing terminal is.

If the first determination unit determines that the state of the first user is the first state, the decision unit may decide on, as the second screen to be displayed on the second information processing terminal, a screen for viewing the video in which the first user is appearing.

If the first determination unit determines that the state of the first user is the second state, the decision unit may decide on, as the second screen to be displayed on the second information processing terminal, a screen for viewing the video that the first user is viewing.

If the first determination unit determines that the state of the first user is the third state, the decision unit may decide on, as the second screen to be displayed on the second information processing terminal, a screen for exchanging messages with the first user.

The one or more computer processors may further include a display processing unit that causes the first object to be displayed. The display processing unit may cause the first object to be displayed within an online notification indicating that a second user related to the second information processing terminal has entered an online state.

The one or more computer processors may further include a display processing unit that causes the first object to be displayed. The display processing unit may cause the first object to be displayed within a list screen listing one or more second users having a specific relationship with the first user.

The first determination unit may determine the state of the first user at a timing at which the acceptance unit accepts the selection.

The first determination unit may determine the state of the first user at a timing at which the reception unit receives the response.

The one or more computer processors may further include a second determination unit that determines a state of each of the one or more second users having the specific relationship with the first user.

The second determination unit may determine which of a fourth state of appearing in a video, a fifth state of viewing a video, and a sixth state of neither appearing in a video nor viewing a video, the state of each of the one or more second users is.

The sixth state may include a seventh state of neither appearing in a video nor viewing a video but being in an online state, and an eighth state of being in an offline state.

The display processing unit may cause the first object to be displayed in association with only a second user determined to be in the fifth state by the second determination unit among the one or more second users.

If a state of a second user related to the second information processing terminal is the sixth state, the second determination unit may further determine which of the seventh state and the eighth state the state of the second user is. The transmission unit may vary a type of the predetermined notification in accordance with which of the seventh state and the eighth state the state of the second user is.

The display processing unit may display, on the list screen, the state of each of the one or more second users having the specific relationship with the first user such that the state is identifiable, together with an image and/or a name indicating a profile of each of the one or more second users.

The predetermined notification may indicate the number of times the first object has been selected by an operation of the first information processing terminal, such that the number of times is confirmable.

An information processing method according to an embodiment of the present disclosure is an information processing method for an information processing system that distributes a video. The information processing method causes one or more computer processors included in the information processing system to execute an acceptance step of accepting selection of a first object from a first information processing terminal; a transmission step of transmitting, in accordance with the selection accepted in the acceptance step, a predetermined notification to a second information processing terminal associated with the first object; a reception step of receiving a response to the predetermined notification from the second information processing terminal; a first determination step of making a determination on a state of a first user related to the first information processing terminal; and a decision step of deciding on, based on a result of the determination made in the first determination step, a second screen to be displayed on the second information processing terminal.

An information processing method according to an embodiment of the present disclosure is an information processing method for a first information processing terminal included in an information processing system that distributes a video. The information processing system includes the first information processing terminal, a second information processing terminal, and a server apparatus. The information processing method causes one or more computer processors included in the first information processing terminal to execute a display processing step of causing a first object to be displayed on a screen, an acceptance step of accepting selection of the first object displayed in the display processing step, a first determination step of making a determination on a state of a first user related to the first information processing terminal, and a transmission step of transmitting the selection accepted in the acceptance step and a result of the determination made in the first determination step to the server apparatus.

A computer program according to an embodiment of the present disclosure is a computer program for a first information processing terminal included in an information processing system that distributes a video. The information processing system includes the first information processing terminal, a second information processing terminal, and a server apparatus. The computer program causes one or more computer processors included in the first information processing terminal to implement a display processing function of causing a first object to be displayed on a screen, an acceptance function of accepting selection of the first object displayed by the display processing function, a first determination function of making a determination on a state of a first user related to the first information processing terminal, and a transmission function of transmitting the selection accepted by the acceptance function and a result of the determination made by the first determination function to the server apparatus.

An information processing method according to an embodiment of the present disclosure is an information processing method for a second information processing terminal included in an information processing system that distributes a video. The information processing system includes a first information processing terminal, the second information processing terminal, and a server apparatus. The information processing method causes one or more computer processors included in the second information processing terminal to execute a reception step of receiving a predetermined notification transmitted from the server apparatus in accordance with selection of a first object in the first information processing terminal; a transmission step of transmitting a response to the predetermined notification received in the reception step to the server apparatus; and a display processing step of causing a second screen to be displayed, based on information about the second screen received from the server apparatus. The second screen is decided on based on a state of a first user related to the first information processing terminal.

A computer program according to an embodiment of the present disclosure is a computer program for a second information processing terminal included in an information processing system that distributes a video. The information processing system includes a first information processing terminal, the second information processing terminal, and a server apparatus. The computer program causes one or more computer processors included in the second information processing terminal to implement a reception function of receiving a predetermined notification transmitted from the server apparatus in accordance with selection of a first object in the first information processing terminal; a transmission function of transmitting a response to the predetermined notification received by the reception function to the server apparatus; and a display processing function of causing a second screen to be displayed, based on information about the second screen received from the server apparatus. The second screen is decided on based on a state of a first user related to the first information processing terminal.

According to one or more embodiments of the present disclosure, it is possible to provide technical improvements for solving or addressing at least part of the above-described issue of the related art. Specifically, it is possible to provide an information processing system, an information processing method, and a computer program that are capable of increasing a distributer's willingness to distribute and/or a viewer's willingness to view.

First, an overview of an information processing system according to an embodiment of the present disclosure will be described with reference to the drawings.

The information processing system according to the embodiment of the present disclosure distributes a video and includes one or more computer processors. A description will be given under the assumption that a video to be distributed includes amination of a character object generated based on motion of a distributor user, but the video is not limited thereto and may be a video that does not include a character object generated based on motion of a distributor user. The video may be, for example, a video in which a distributor user himself/herself appears, or a video including voice of a distributor user and a predetermined image that are reproduced, such as a Karaoke video or a live game video. Alternatively, the video may include a game screen and/or a captured image of a real space on which a character object is displayed in a superimposed manner, as described below.

System Configuration

As illustrated as an example in FIG. 1, an information processing system 1000 according to an embodiment of the present disclosure may include one or more viewer user terminals 1100, and an information processing apparatus (support computer) 1300 that is connected to the viewer user terminals 1100 via a network 1200 and that is disposed in a video distribution studio or the like.

The information processing apparatus 1300 may be connected to a server apparatus via the Internet, and the server apparatus may perform some or all of processing operations that are to be performed by the information processing apparatus 1300. The server apparatus may be an information processing apparatus 2400 illustrated in FIG. 2.

In this specification, distribution by the information processing system 1000 is referred to as studio distribution.

In studio distribution, a marker attached to a distributor user (actor) is photographed by a camera installed in a studio, and thereby motion of the whole body of the distributor user is reflected in a character in real time by using an existing motion capture technique.

Figure 2:
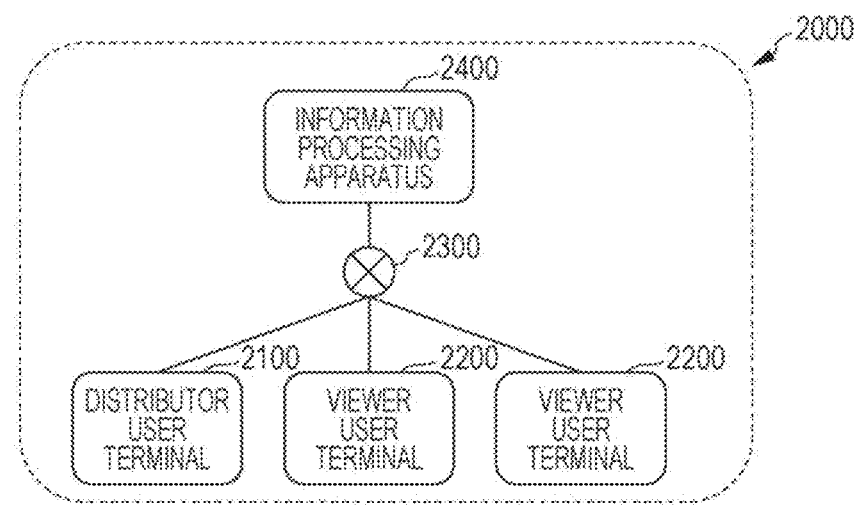
FIG. 2 is a system configuration diagram illustrating an example of an information processing system according to an embodiment of the present disclosure.

The information processing system 1000 according to the embodiment of the present disclosure may cooperate with another information processing system 2000 illustrated as an example in FIG. 2. The information processing system 2000 illustrated in FIG. 2 may include a distributor user terminal 2100, one or more viewer user terminals 2200, and the information processing apparatus (server apparatus) 2400 connected to the distributor user terminal 2100 and the viewer user terminals 2200 via a network 2300.

In the foregoing example, the distributor user terminal 2100 may be an information processing terminal, such as a smartphone. In this specification, distribution by the information processing system 2000 is referred to as mobile distribution.

In mobile distribution, the face of a distributor user is photographed by a camera equipped in the distributor user terminal 2100, and motion of the face of the distributor user is reflected in the face of a character in real time by using an existing face tracking technique.

Videos generated by the information processing system 1000 and the information processing system 2000 may be distributed, for example, from one video distribution platform to viewer users.

In both types of distribution, processing of generating animation by reflecting motion in a character and processing of displaying a gift described below may be performed among a distributor user terminal, a viewer user terminal, an information processing apparatus, and another apparatus.

Specifically, face motion data and audio data of a distributor user are transmitted from a distributor user terminal to a terminal or apparatus that generates animation of a character object. Body motion data may be transmitted in addition to the face motion data.

A description will be given below under the assumption that the processing of generating animation is performed by each of a distributor user terminal and a viewer user terminal, but the embodiment is not limited thereto.

A description will be given below under the assumption that the information processing system according to the embodiment of the present disclosure has the system configuration illustrated in FIG. 2 (mobile distribution). However, the information processing system may have the system configuration illustrated in FIG. 1.

In mobile distribution, there is no distinction between a distributor user and a viewer user. A viewer user is able to perform mobile distribution any time, and a distributor user may become a viewer user when viewing a video of another distributor user.

A description will be given below under the assumption that the information processing system according to the embodiment of the present disclosure has the system configuration illustrated in FIG. 2 (mobile distribution) and the system configuration illustrated in FIG. 3. An information processing system 3000 according to an embodiment of the present disclosure illustrated in FIG. 3 may include a first information processing terminal 100, one or more second information processing terminals 200, and an information processing apparatus (server apparatus) 400 connected to the first information processing terminal 100 and the one or more second information processing terminals 200 via a network 300.

As described above, a video distributed by the information processing system according to the embodiment of the present disclosure may be a game screen on which a distributor user plays and/or a captured image of a real space. In this case, a character object generated based on motion of the distributor user or a real image of the distributor user may be displayed together with the game screen. When a distributor user is included in the captured image of the real space, a character object generated based on motion of the distributor user may be displayed on the real image of the distributor user in a superimposed manner (augmented reality (AR)). Alternatively, animation of a gift object or the like may be displayed on the captured image of the real space in a superimposed manner.

In an embodiment of the present disclosure, a distributor user terminal, a viewer user terminal, a first information processing terminal, and a second information processing terminal may each be a smartphone (multifunction telephone terminal), a tablet terminal, a personal computer, a console game machine, a head-mounted display (HMD), a wearable computer such as a glasses-type wearable terminal (AR glasses or the like), or an information processing apparatus of another type capable of reproducing a video. These terminals may each be a stand-alone apparatus that is operated on its own or be constituted by a plurality of apparatuses connected to each other so as to be capable of transmitting/receiving various data to/from each other.

Hardware Configuration

Now, the hardware configuration of the information processing apparatus 400 included in the information processing system 3000 will be described with reference to FIG. 4. The information processing apparatus 400 includes a processor 401, a memory 402, a storage 403, an input/output interface (I/F) 404, and a communication interface (I/F) 405. The individual elements are connected to each other via a bus B.

With cooperation among the processor 401, the memory 402, the storage 403, the input I/F 404, and the communication I/F 405, the information processing apparatus 400 is capable of implementing the functions and methods described in the present embodiment.

The processor 401 executes functions and/or methods implemented by code or instructions included in a program stored in the storage 403. The processor 401 may include, for example, a central processing unit (CPU), a micro processing unit (MPU), a graphics processing unit (GPU), a microprocessor, a processor core, a multiprocessor, an application-specific integrated circuit (ASIC), a field programmable gate array (FPGA), or the like, and may implement individual processing operations disclosed in individual embodiments by using a logic circuit (hardware) or a dedicated circuit formed in an integrated circuit (IC) chip, a large scale integration (LSI), or the like. These circuits may be formed of one or more integrated circuits, and a plurality of processing operations described in individual embodiments may be implemented by one integrated circuit. The LSI may be referred to as VLSI, super LSI, ultra LSI, or the like according to a difference in the degree of integration. In an exemplary implementation, processor 401 is processing circuitry and/or circuitry and includes transistors and other circuitry therein. The processor 401 may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

The memory 402 temporarily stores a program loaded from the storage 403 and provides a work area to the processor 401. The memory 402 also temporarily stores various data generated while the processor 401 is executing the program. The memory 402 includes, for example, a random access memory (RAM), a read only memory (ROM), or the like.

The storage 403 stores a program. The storage 403 includes, for example, a hard disk drive (HDD), a solid state drive (SSD), a flash memory, or the like.

The communication I/F 405 is mounted as hardware such as a network adaptor, communication software, or a combination thereof, and transmits and receives various data via the network 300. The communication may be executed either in a wired manner or in a wireless manner, and any communication protocol may be used as long as mutual communication can be executed. The communication I/F 405 communicates with another information processing apparatus via the network 300. The communication I/F 405 transmits various data to another information processing apparatus in response to an instruction from the processor 401. The communication I/F 405 receives various data from another information processing apparatus and transmits the data to the processor 401.

The input/output I/F 404 includes an input device that inputs various operations to the information processing apparatus 400, and an output device that outputs a result of processing performed by the information processing apparatus 400. The input device and the output device included in the input/output I/F 404 may be integrated together or separated from each other.

The input device is formed of any one or more of all types of devices capable of receiving input from a user and transmitting information related to the input to the processor 401. The input device includes, for example, a touch screen, a touch display, hardware keys such as a keyboard, a pointing device such as a mouse, a camera (an operation is input via an image), or a microphone (an operation is input by audio).

The input device may include a sensor unit. The sensor unit includes one or more sensors that detect a face motion representing a change in expression of a user, and a body motion representing a change in the relative position of the body of a user to the sensor unit. A face motion includes a motion such as blinking or opening/closing of the mouth. An existing unit may be used as the sensor unit. An example of the sensor unit includes a time of flight (ToF) sensor that measures and detects a time of flight until light radiated toward a user is reflected by the face or the like of the user and returns, a camera that photographs the face of the user, and an image processing unit that performs image processing on data captured by the camera. The sensor unit may include an RGB camera that captures a visible-light image and a near-infrared camera that captures a near-infrared image. As the RGB camera or the near-infrared camera, for example, "TrueDepth" of "iPhone X (registered trademark)", "LiDAR" of "iPad Pro (registered trademark)", or another type of ToF sensor mounted in a smartphone may be used. Specifically, this type of camera projects several tens of thousands of nonvisible dots on the face of a user by using a dot projector. Subsequently, the camera detects reflected light of a dot pattern, analyzes the reflected light to create a depth map of the face, and captures an infrared image of the face or the like to capture accurate face data. An arithmetic processing unit of the sensor unit generates various pieces of information based on the depth map and the infrared image, and compares the information with registered reference data to calculate depths of individual points of the face (the distances between the individual points and the near-infrared camera) and displacements of positions other than the depths.

The sensor unit may have a function of tracking a user's hand (hand tracking), as well as the face. The sensor unit may further include a sensor other than the foregoing sensors, such as an acceleration sensor or a gyro sensor. The sensor unit may have a space mapping function of recognizing, based on a detection result of the foregoing ToF sensor or another existing sensor, an object in a real space in which a user is present, and mapping the recognized object on a space map. Hereinafter, detection data of a face motion and detection data of a body motion will be simply referred to as "tracking data" when both are not particularly distinguished from each other. The image processing unit of the sensor unit may be included in a control unit that can be included in the information processing system according to the embodiment of the present disclosure.

An operation unit serving as the input device may be provided in accordance with the type of a user terminal. An example of the operation unit is a touch screen integrated with a display, an operation button provided on a casing or the like of the user terminal, a keyboard, a mouse, a controller operated by a user's hand, or the like. The controller may include various existing sensors, for example, an acceleration sensor and an inertial measurement sensor (inertial measurement unit (IMU)), such as a gyro. Another example of the operation unit may be a tracking device that specifies a motion of the hand, a motion of the eyes, the motion of the head, the direction of the line of sight, or the like of a user. In this embodiment, for example, an instruction from a user may be determined based on a motion of the user's hand, and distribution of a video may be started or ended, or various operations, such as evaluating a message or video and making a request for displaying a predetermined object (for example, a gift described below), may be executed. When the sensor unit has an input interface function, such as a hand tracking function, the operation unit may be omitted.

The output device outputs a result of processing performed by the processor 401. The output device includes, for example, a touch screen, a speaker, or the like.

Figure 4:
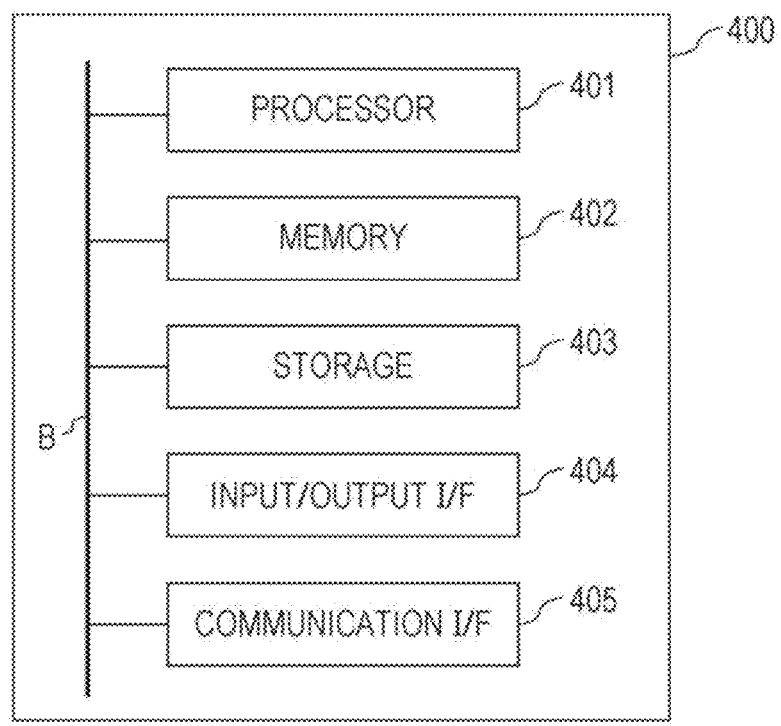
FIG. 4 is a configuration diagram illustrating an example of a hardware configuration of an information processing apparatus according to an embodiment of the present disclosure.

The first information processing terminal 100 and the second information processing terminal 200 according to the embodiment of the present disclosure may also each have a hardware configuration similar to that illustrated in FIG. 4 unless otherwise specified.

Functional Configuration

Figure 5:
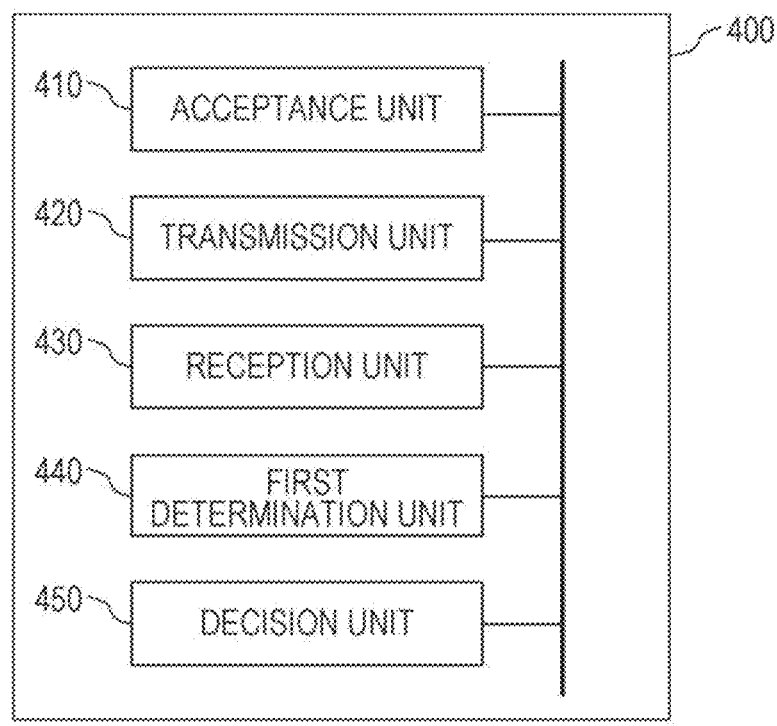
FIG. 5 is a configuration diagram illustrating an example of a functional configuration of the information processing apparatus according to the embodiment of the present disclosure.

The one or more computer processors (in this example, the information processing apparatus 400) includes, as illustrated in FIG. 5, an acceptance unit 410, a transmission unit 420, a reception unit 430, a first determination unit 440, and a decision unit 450.

The acceptance unit 410 accepts selection of a first object from the first information processing terminal 100.

A state of a first user related to the first information processing terminal 100 determines whether the first information processing terminal 100 is the distributor user terminal 2100 or the viewer user terminal 2200 illustrated in FIG. 2, or a user terminal that is not either of them (a terminal that is performing neither distribution nor viewing). This will be described below.

Figure 6:
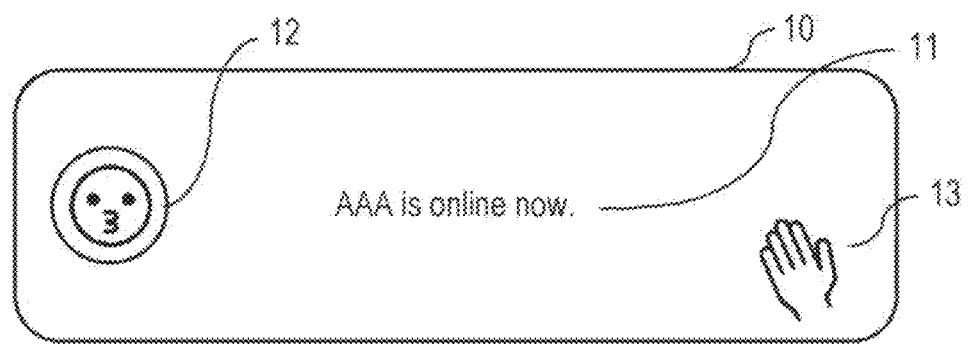
FIG. 6 is a conceptual diagram illustrating an online notification displayed on a first information processing terminal.

The first object may be, for example, as illustrated in FIG. 6, displayed within an online notification 10 indicating that a second user related to the second information processing terminal 200 has entered an online state. In the example illustrated in FIG. 6, the online notification 10 includes a text 11 "AAA (user name) is online now", a profile image 12 of the second user, and a first object 13.

Figure 7:
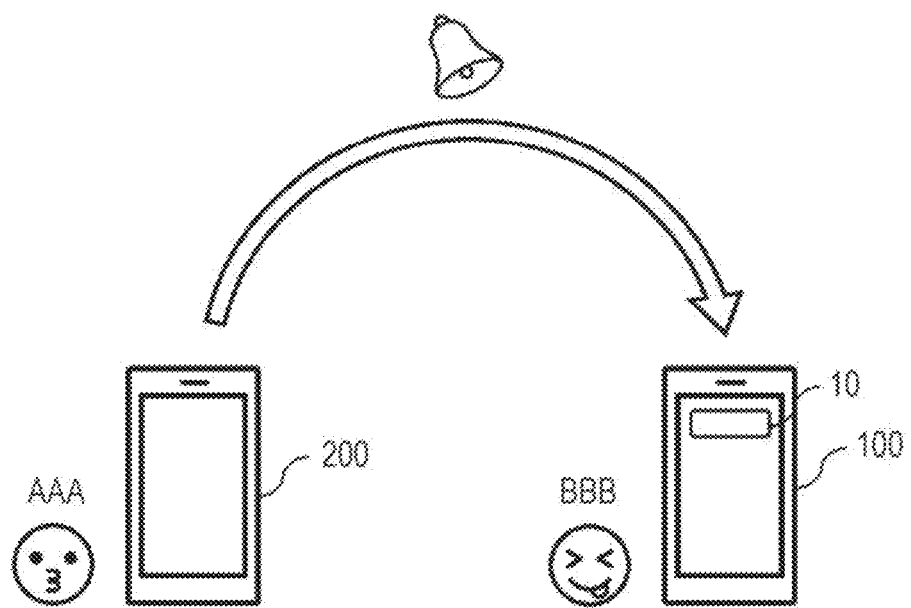
FIG. 7 is a conceptual diagram illustrating a situation in which an online notification is transmitted.

The online notification 10 is transmitted to the first information processing terminal 100 related to the first user when the second user related to the second information processing terminal 200 has started a specific application (has entered an online state), as conceptually illustrated in FIG. 7.

The second user may be, for example, a user having a mutually followed relationship with the first user.

The transmission unit 420 transmits a predetermined notification to the second information processing terminal 200 associated with the first object 13 in accordance with the selection accepted by the acceptance unit 410.

Figure 8:
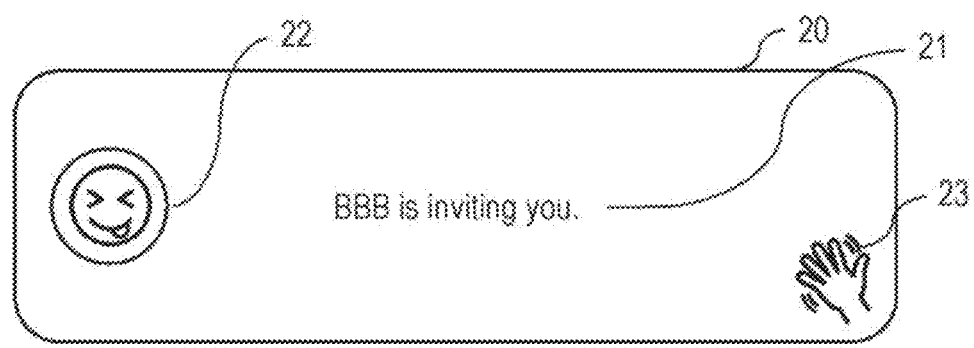
FIG. 8 is a conceptual diagram illustrating an invitation notification displayed on a second information processing terminal.

The predetermined notification may be, for example, as illustrated in FIG. 8, an invitation notification 20 indicating that the first user related to the first information processing terminal 100 is inviting the second user. In the example illustrated in FIG. 8, the invitation notification 20 includes a text 21 "BBB (user name) is inviting you", a profile image 22 of the first user, and a second object 23.

Figure 9:
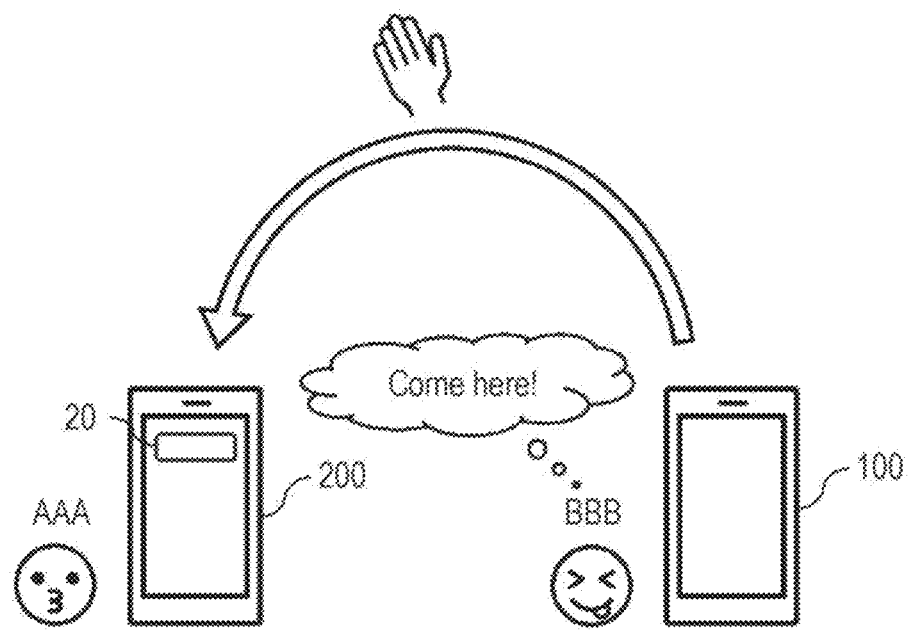
FIG. 9 is a conceptual diagram illustrating a situation in which an invitation notification is transmitted.

The invitation notification 20 is transmitted to the second information processing terminal 200 related to the second user when the first user has selected the first object 13, as conceptually illustrated in FIG. 9.

The reception unit 430 receives a response to the predetermined notification from the second information processing terminal 200.

Responding to the predetermined notification is performed by tapping the displayed invitation notification 20 by the second user. Alternatively, responding may be performed by tapping the second object 23 displayed in the invitation notification 20.

The first determination unit 440 determines a state of the first user related to the first information processing terminal 100.

The state of the first user is roughly classified into distributing a video, viewing a video, or other than that. The details will be described below.

The decision unit 450 decides on, based on a determination result of the first determination unit 440, a second screen to be displayed on the second information processing terminal 200.

For example, if the first determination unit 440 determines that the first user is distributing a video, the decision unit 450 causes the second information processing terminal 200 to display, as the second screen, a screen for viewing the video that is being distributed by the first user.

For example, if the first determination unit 440 determines that the first user is viewing a video, the decision unit 450 causes the second information processing terminal 200 to display, as the second screen, a screen for viewing the video that is being viewed by the first user.

For example, if the first determination unit 440 determines that the first user is neither distributing nor viewing a video, the decision unit 450 causes the second information processing terminal 200 to display, as the second screen, a screen for chatting with the first user.

Figures 10, 11:
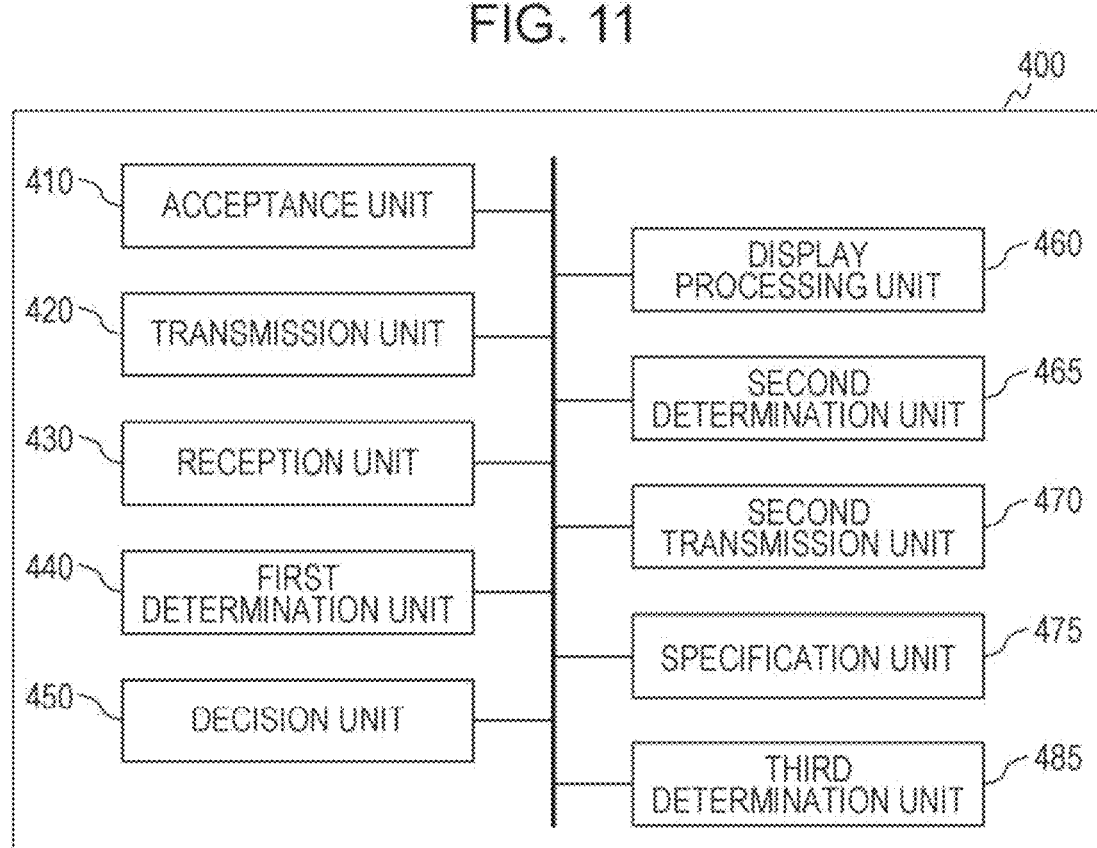
FIG. 10 is a table showing relationships between states of a first user and a second screen.
FIG. 11 is a configuration diagram illustrating another example of the functional configuration of the information processing apparatus according to the embodiment of the present disclosure.

FIG. 10 is a table showing the details about screens displayed as the second screen in cases where the first user is distributing a video, the first user is viewing a video, and other than that.

As described above, a predetermined notification transmitted as a result of selection of a first object is a notification in which the first user gives a message "come here" to the second user. Specifically, the predetermined notification may be transmitted to invite the second user to come and view a video that is being distributed by the first user, to invite the second user to come and view a video that is being distributed by another user, or to have a chat.

With the above-described configuration, it is possible to provide technical improvements for solving or addressing at least part of the above-described issue of the related art.

Specifically, with the above-described configuration, the second user can be invited as a viewer user of a video, and thus it is possible to increase the number of viewers of a video that is being distributed by the first user or a video that is being distributed by another user. This results in an increase in the distributer's willingness to distribute.

In addition, the second user can be invited to view a recommended video from the first user (invited to a viewing screen), which results in an increase in willingness to view.

In addition, the first user is able to feel free to address the second user, which results in promoted communication.

As described above, the first determination unit 440 may determine which of a first state, a second state, and a third state the state of the first user related to the first information processing terminal 100 is. Hereinafter, these states will be described in detail.

The first state is a state in which the first user is appearing in a video. Appearing in a video is a state in which the first user or a character object of the first user is appearing in a video that is being distributed, and includes a state in which the first user is a distributor user of a video or a state in which the first user is participating as a guest user in a video that is being distributed by another distributor user.

The second state is a state in which the first user is viewing a video on a main screen. Viewing a video on a main screen includes a state in which the first user is a viewer user viewing a video that is being distributed by another distributor user. The second state does not include a state in which a video is being viewed on a sub-screen. The details of the main screen and the sub-screen will be described below in the description of "audio small-window distribution".

The third state is a state in which the first user is neither appearing in a video nor viewing a video on a main screen. This is a state that is neither the first state nor the second state.

If the first determination unit 440 determines that the state of the first user is the first state, the decision unit 450 may decide on a screen for viewing a video in which the first user is appearing as the second screen to be displayed on the second information processing terminal 200.

Accordingly, the first user in the first state becomes able to invite the second user to come and view the video that is being distributed by the first user.

If the first determination unit 440 determines that the state of the first user is the second state, the decision unit 450 may decide on a screen for viewing a video that is being viewed by the first user as the second screen to be displayed on the second information processing terminal 200.

Accordingly, the first user in the second state becomes able to invite the second user to come and view the video that is being viewed by the first user. As a result of viewing the video of a distributor user supported by the first user (recommended user) together with the second user, communication with the second user can be promoted. The first user becomes able to support the recommended user by increasing the number of viewers and increasing the number of times of gifting. Such support further increases the distributor user's willingness to distribute a video.

If the first determination unit 440 determines that the state of the first user is the third state, the decision unit 450 may decide on a screen for exchanging messages with the first user as the second screen to be displayed on the second information processing terminal 200.

Accordingly, the first user in the third state becomes able to invite the second user to start a chat with the first user.

In this way, the first user is able to feel free to address the second user, which results in promoted communication.

The first determination unit 440 may determine the state of the first user at a timing at which the acceptance unit 420 accepts selection.

With this configuration, the second screen is decided on in accordance with the state of the first user at a timing at which the acceptance unit 420 accepts selection, regardless of a timing at which the reception unit 430 receives a response to a predetermined notification from the second information processing terminal 200.

Alternatively, the first determination unit 440 may determine the state of the first user at a timing at which the reception unit 420 receives a response.

With this configuration, the second screen is decided on in accordance with the state of the first user at a timing at which the reception unit 430 receives a response to a predetermined notification from the second information processing terminal 200, regardless of a timing at which the acceptance unit 420 accepts selection from the first information processing terminal 100.

If distribution of the video to be displayed on the second screen has finished when the first determination unit 440 determines the state of the first user at a timing at which the acceptance unit 420 accepts selection, the decision unit 450 may decide on, as the second screen, a screen indicating that the distribution has finished or a profile screen of the distributor user, or may decide on again the second screen in accordance with a determination result of the state of the first user at a timing at which the reception unit 420 receives a response.

The one or more computer processors according to the embodiment of the present disclosure may further include a display processing unit 460, as illustrated in FIG. 11.

The display processing unit 460 is used to display a first object, specifically, causes the first object to be displayed within the online notification 10 indicating that the second user related to the second information processing terminal 200 has entered the online state. The concept of the online notification 10 is as illustrated in FIG. 6.

Whether to receive the online notification 10 can be set in the first information processing terminal 100.

In this case, the one or more computer processors according to the embodiment of the present disclosure may further include a second determination unit 465 and a second transmission unit 470.

The second determination unit 465 determines whether or not the first information processing terminal 100 is capable of receiving the online notification 10. Whether to receive the online notification 10 can be set with respect to each of one or more second information processing terminals 200.

If a determination result of the second determination unit 465 is affirmative, the second transmission unit 470 transmits the online notification 10 to the first information processing terminal 100.

It is also possible to set whether to transmit the online notification 10 in the second information processing terminal 200.

In this case, the one or more computer processors according to the embodiment of the present disclosure may further include a specification unit 475.

In this case, the second determination unit 465 determines whether or not the second information processing terminal 200 is capable of transmitting the online notification 10. Whether to transmit the online notification 10 can be set with respect to each of one or more first information processing terminals 100.

If a determination result of the second determination unit 465 is affirmative, the specification unit 475 specifies a specific first information processing terminal 100 to which the online notification 10 is to be transmitted.

The second transmission unit 470 transmits the online notification 10 to the specific first information processing terminal 100 specified by the specification unit 475.

The specific first information processing terminal 100 is a first information processing terminal 100 capable of receiving the online notification 10 from the second information processing terminal 200 among first information processing terminals 100 to which the second information processing terminal 200 is capable of transmitting the online notification 10.

The predetermined notification may indicate the number of times the first object 13 has been selected by an operation of the first information processing terminal 100, such that the number of times is confirmable.

As illustrated in FIG. 8, the second object 23 is displayed in the predetermined notification (invitation notification 20). The second object 23 may be displayed the number of times corresponding to the number of times the first object 13 has been selected by the first user in the first information processing terminal 100.

With this configuration, the degree of invitation from the first user may be measured based on the number of times the second object 23 has been displayed.

The number of times the second object 23 is displayed has an upper limit. If the first object 13 is selected beyond the upper limit, the first object 13 is not displayed any more.

A description has been given of an example in which the first object 13 is displayed in the online notification 10 illustrated in FIG. 6. The first object 13 may be displayed by the display processing unit 460 within a list screen listing one or more second users having a specific relationship with the first user.

Figures 12, 13:
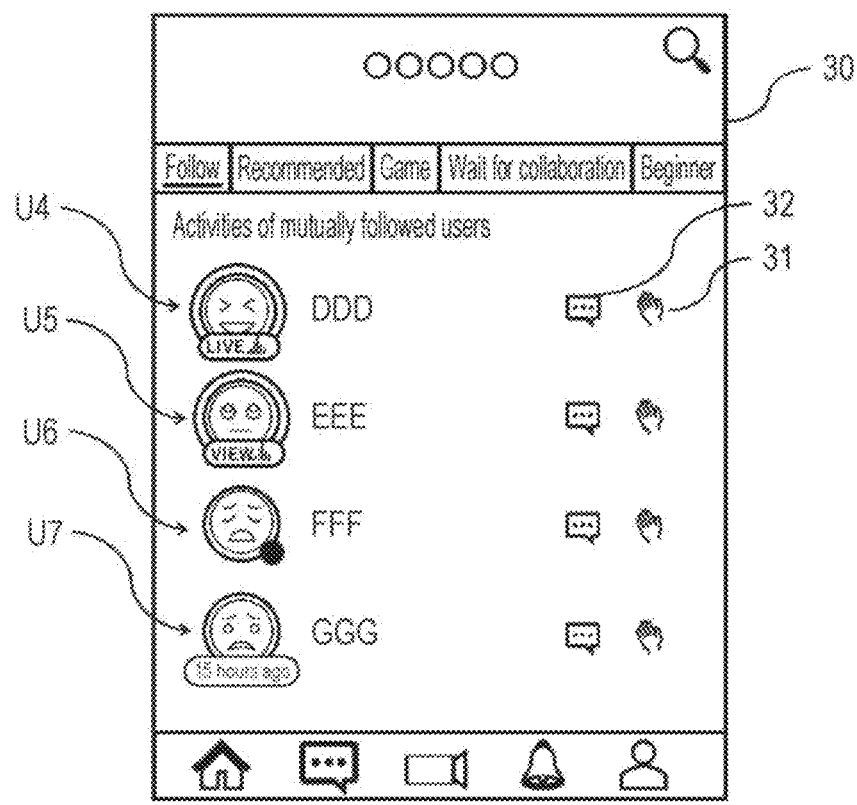
FIG. 12 is a conceptual diagram illustrating a screen displayed on a user terminal.
FIG. 13 is a table showing relationships between states of a second user and online/offline states.

FIG. 12 illustrates a list screen 30 listing users having a mutually followed relationship. The list screen 30 is displayed, upon selection of a follow tab, as a list screen listing one or more second users having a specific relationship with the first user. "Mutually followed" means a relationship in which one is a follower of another and vice versa.

On the list screen 30, profile images and names of users having a mutually followed relationship are displayed.

As illustrated in FIG. 12, a first object 31 is displayed for each of the second users on the list screen 30. A chat object 32 may also be displayed together with the first object 31. Selecting of this chat object makes it possible to move to an individual chat screen for chatting with the second user.

If the first user selects the first object 31 on the list screen and if the second user selects the invitation notification 20 transmitted to the second user, an individual chat screen for chatting with the first user may be displayed as the second screen for the second user.

The individual chat screen for the first user and the second user may be a common screen. It is assumed that the first user inputs a first comment to address the second used on the chat screen displayed upon selection of the chat object 32, and that the second user inputs a first comment to address the first user on the chat screen displayed upon selection of the invitation notification 20.

The one or more computer processors according to the embodiment of the present disclosure may further include a third determination unit 485 as illustrated in FIG. 11.

The third determination unit 485 determines a state of each of one or more second users having a specific relationship with the first user.

Specifically, the third determination unit 485 determines which of a fourth state of appearing in a video, a fifth state of viewing a video, and a sixth state of neither appearing in a video nor viewing a video the state of the second user is.

The sixth state may include a seventh state of neither appearing in a video nor viewing a video but is being in an online state, and an eighth state of being in an offline state.

FIG. 13 is a table showing relationships between these states and online/offline states.

The display processing unit 160 may display, on the list screen 30, the state of each of the one or more second users having the specific relationship with the first user in an identifiable manner together with the image and/or name indicating a profile of each of the one or more second users.

Figure 14:
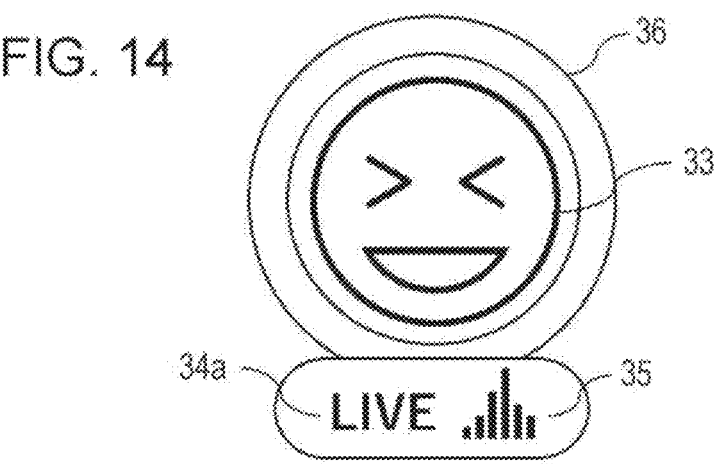
FIG. 14 is a conceptual diagram illustrating a profile image of a second user displayed such that a state of the second user is identifiable.

FIG. 14 is a conceptual diagram for describing an image indicating a profile of a second user U4 illustrated in FIG.

12. For the second user U4 in the fourth state, a text 34a "LIVE" and an audio object 35 indicating that audio is to be reproduced are attached to an image 33 indicating the profile. A frame 36 surrounding the image indicating the profile may be decorated so as to be distinguishable from the other states.

Figure 15:
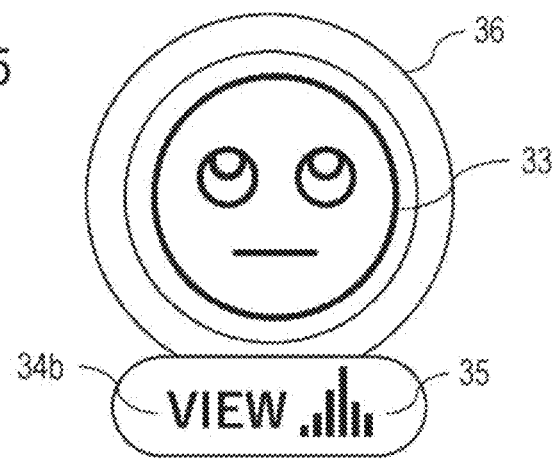
FIG. 15 is a conceptual diagram illustrating a profile image of a second user displayed such that a state of the second user is identifiable.

FIG. 15 is a conceptual diagram for describing an image indicating a profile of a second user U5 illustrated in FIG. 12. For the second user U5 in the fifth state, a text 34b "VIEW" and the audio object 35 indicating that audio is to be reproduced are attached to the image 33 indicating the profile. As in the above-described example of the fourth state, the frame 36 surrounding the image indicating the profile may be decorated so as to be distinguishable from the other states.

Figure 16:
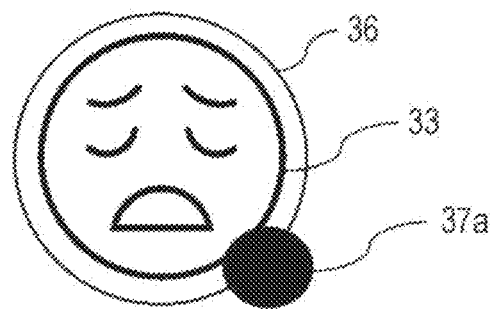
FIG. 16 is a conceptual diagram illustrating a profile image of a second user displayed such that a state of the second user is identifiable.

FIG. 16 is a conceptual diagram for describing an image indicating a profile of a second user U6 illustrated in FIG. 12. For the second user U6 in the six state and the seventh state, an online object 37a indicating an online state is attached to the image 33 indicating the profile. The frame 36 surrounding the image indicating the profile is not decorated.

Figure 17:
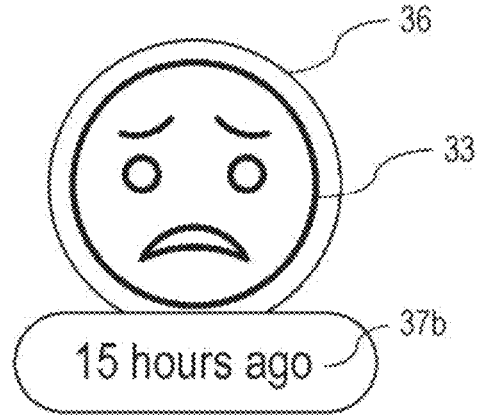
FIG. 17 is a conceptual diagram illustrating a profile image of a second user displayed such that a state of the second user is identifiable.

FIG. 17 is a conceptual diagram for describing an image indicating a profile of a second user U7 illustrated in FIG. 12. For the second user U7 in the six state and the eighth state, an object 37b indicating an elapsed time from when an offline state starts is attached to the image 33 indicating the profile. The frame 36 surrounding the image indicating the profile is not decorated.

The display processing unit 460 may cause the first object 31 to be displayed in association with only the second user determined to be in the fifth state by the third determination unit 485.

Alternatively, the display processing unit 460 may cause the first object 31 not to be displayed in association with the second user determined to be in the fourth state by the third determination unit 485.

Figure 18:
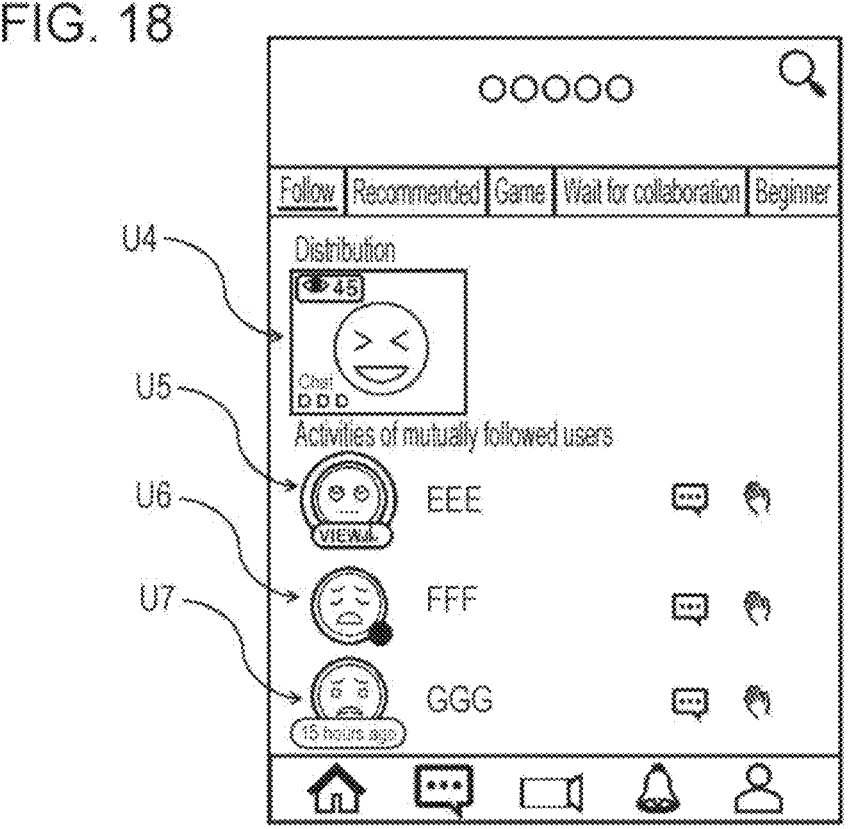
FIG. 18 is a conceptual diagram illustrating a screen displayed on a user terminal.

In FIG. 18, the second user U4 in the fourth state is not displayed in the field of "activities of mutually followed users", but a thumbnail image of a distribution channel is displayed in the field of "distribution".

In this way, regarding the second user who is distributing a video, it is preferable to preferentially view the distributed video instead of inviting the user.

If the second user related to the second information processing terminal 200 is in the sixth state, the third determination unit 485 may further determine which of the seventh state and the eighth state the state of the second user is. At this time, the transmission unit 420 varies the type of predetermined notification in accordance with which of the seventh state and the eighth state the state of the second user is.

Specifically, when the second user is in the seventh state, a dedicated application is running in the second information processing terminal 200, and thus the predetermined notification is displayed on a screen as a notification in the dedicated application. This example is applicable to the fifth state as well as the seventh state.

On the other hand, when the second user is in the eighth state, the dedicated application is not running in the second information processing terminal 200, and thus the predetermined notification is displayed on a screen as a push notification by a function of the second information processing terminal 200.

In the second information processing terminal 200, a setting of whether to receive the predetermined notification can be made. Whether to receive the predetermined notification can be set with respect to each of one or more first information processing terminals 100.

In this case, the second determination unit 465 determines whether or not the second information processing terminal 200 is capable of receiving the predetermined notification.

The transmission unit 420 transmits the predetermined notification to the second information processing terminal 200 if a determination result of the second determination unit 465 is affirmative.

Now, a description will be given of various functions implemented by the information processing system according to the embodiment of the present disclosure and executable in a user terminal having an activated application, and transition of a screen that is displayed, with reference to the drawings.

First, a process for starting distribution of a video will be described.

The one or more computer processors according to the embodiment of the present disclosure may include a distribution start request acceptance unit, a distribution setting unit, and a distribution start unit.

The distribution start request acceptance unit accepts a distribution start request of a first video including animation of a character object, from a distributor user terminal of a distributor user.

The first video is a video including animation of a character object. In this specification, a character object may be referred to as an "avatar".

The distribution start request may be transmitted to the information processing apparatus 2400 from a user terminal (which becomes the distributor user terminal 2100 later) that has activated a dedicated application for accessing the video distribution platform (video distributing/viewing application), upon selection of a distribution button disposed on an avatar setting screen or the like displayed on the user terminal.

Figure 19:
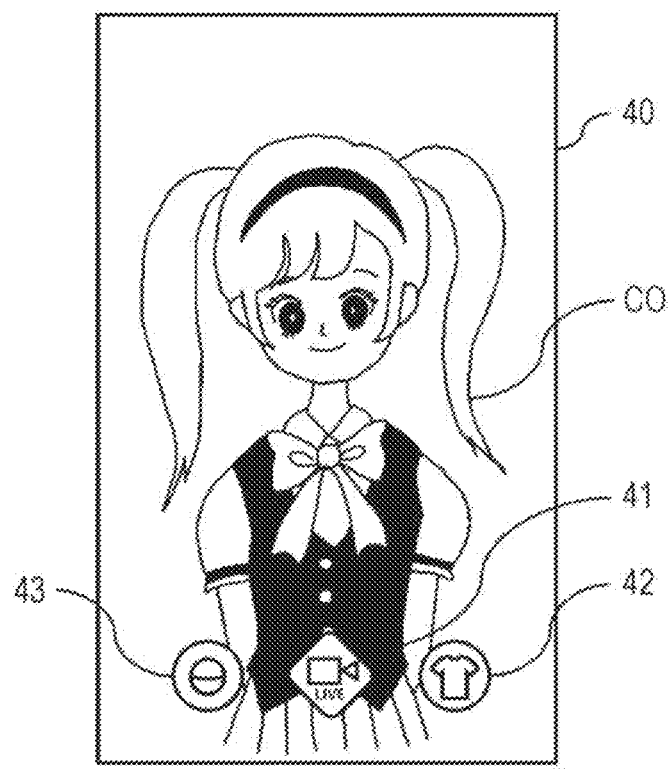
FIG. 19 is a conceptual diagram illustrating a screen displayed on a user terminal.

FIG. 19 illustrates an example of an avatar setting screen 40. On the avatar setting screen 40, a character object CO, a distribution button 41, a change clothes button 42, a gacha button 43, and so forth may be displayed.

Upon the change clothes button 42 being selected by a user, a screen for selecting various avatar parts, such as the eyes, nose, mouth, hair, accessory, clothes, and background of the character object, is displayed.

Upon the gacha button 43 being selected by the user, a lottery screen for obtaining the avatar parts is displayed.

Upon the distribution button 41 being selected by the user, a distribution start request is transmitted to the information processing apparatus 2400.

The distribution setting unit makes a distribution setting of a first video in accordance with designation by the distributor user terminal 2100 in response to the distribution start request of the first video accepted by the distribution start request acceptance unit.

Figure 20:
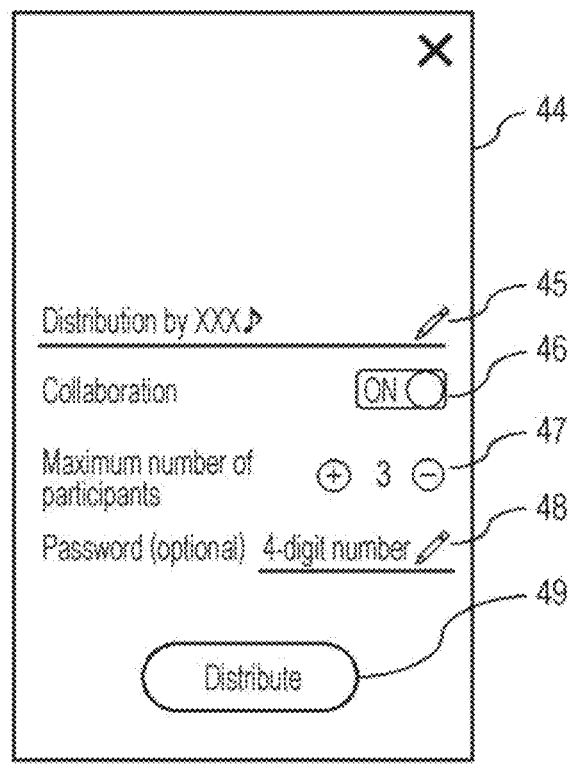
FIG. 20 is a conceptual diagram illustrating a screen displayed on a user terminal.

For example, upon the distribution button 41 being selected, the screen displayed on the distributor user terminal 2100 changes from the avatar setting screen 40 illustrated in FIG. 19 to a distribution setting screen 44 illustrated in FIG. 20.

The distribution setting may include at least one of a setting related to the title of the first video, a setting related to whether another user is allowed to appear in the first video, a setting related to the number of people allowed to appear in the first video, and a setting related to a password.

These distribution settings can be made in a title setting field 45, a collaboration setting field 46, a number-of-people setting field 47, and a password setting field 48 in FIG. 20, respectively.

The title of the first video can be freely set by the distributor user within a range of the number of letters up to an allowable upper limit. If no title is input by the distributor user, a preset title including the name of the distributor user or the character object, such as "Distribution by XXX", may be automatically set.

Whether another user is allowed to appear in the first video can be freely set by the distributor user. If allowed, another user is able to apply for appearance to the distributor user. If not allowed, another user is unable to apply for appearance to the distributor user. In this specification, a state in which another user appears in the video of the distributor user may be referred to as "collaboration". The details of collaboration will be described below.

The number of people allowed to appear in the first video can be set only if another user is allowed to appear in the first video, and can be freely set by the distributor user within the range of the number of people up to an allowable upper limit.

The password can be optionally set only if another user is allowed to appear in the first video, and the distributor user is able to freely set a number having a designated number of digits. Inputting of the password is required when another user applies for appearance in the first video.

The distribution start unit distributes information about the first video to the viewer user terminal 2200 of a viewer user in accordance with the conditions set by the distribution setting unit.

A distribution start instruction is transmitted upon a distribution start button 49 illustrated in FIG. 20 being selected.

For example, the distribution start unit distributes information related to a video including animation of a character object of the distributor user (first video) to the viewer user terminal 2200 of the viewer user (avatar distribution).

The information related to the first video includes, for example, motion information indicating motion of the character object, audio information of the distributor user, and gift object information indicating a gift received from another viewer user. The gift object information includes at least gift object identification information identifying the type of gift object and position information indicating the position at which the gift object is to be displayed.

The distribution start unit may distribute the video live via the above-described video distribution platform.

Figure 21:
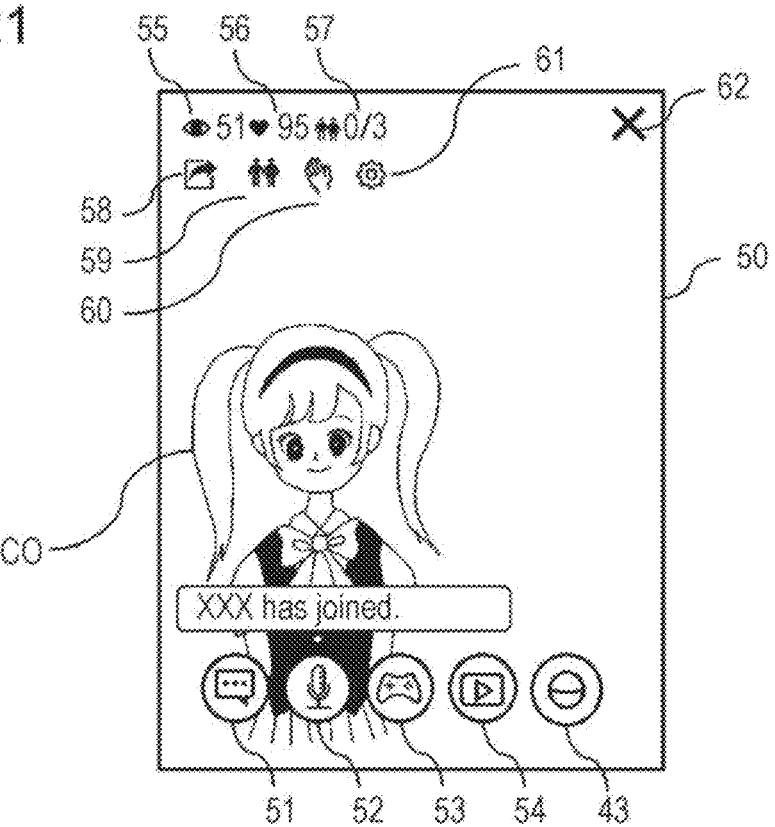
FIG. 21 is a conceptual diagram illustrating a screen displayed on a user terminal.

FIG. 21 illustrates an avatar distribution screen 50 displayed on the distributor user terminal 2100.

On the avatar distribution screen 50, the character object CO is displayed, and also a comment input button 51 for inputting a comment by the distributor user, an audio switching button 52 for switching ON/OFF of audio, a play start button 53 for playing a game executed by a computer described below, an external service cooperation button 54 for viewing a video provided by an external service, and the gacha button 43 for obtaining avatar parts may be displayed.

In addition, a total-number-of-viewers indicator 55, a total-number-of-likes indicator 56, a number-of-collaborations indicator 57, a sharing-with-external-SNS button 58, a guest details button 59, an invitation button 60, and a setting button 61 may be displayed at an upper portion of the avatar distribution screen 50. In addition, an end button 62 for ending distribution is displayed.

A detailed description of these indicators and buttons is omitted. Selecting of the setting button 61 makes it possible to change the distribution settings made on the distribution setting screen 44.

FIG. 21 illustrates an example in which distribution has started with the settings being made on the distribution setting screen 44 that another user is allowed to appear in the first video and the number of people allowed to appear in the first video is three, and thus the character object CO is displayed at the lower left. In this state, up to three character objects of other users can appear in the free space.

Transition of the screen at the time of performing avatar distribution of an embodiment of the present disclosure has been described above.

Next, a process for starting viewing of a video will be described.

Figure 22:
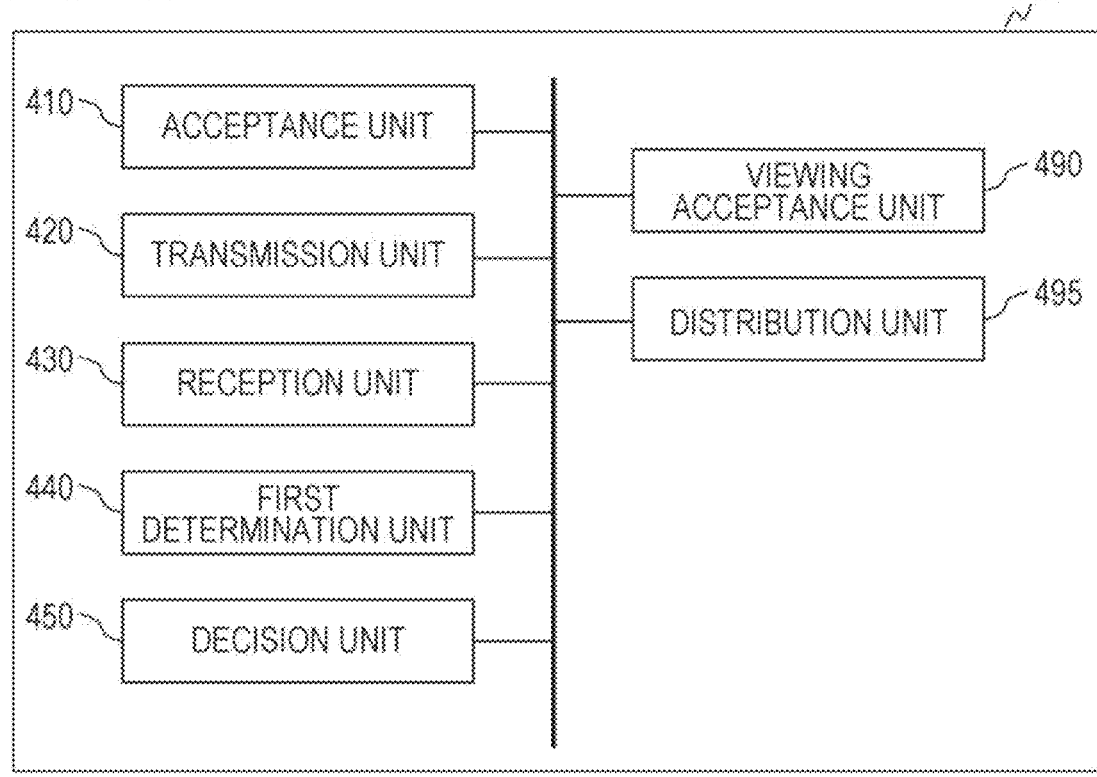
FIG. 22 is a configuration diagram illustrating another example of the functional configuration of the information processing apparatus according to the embodiment of the present disclosure.

The one or more computer processors according to the embodiment of the present disclosure may further include a viewing acceptance unit 490 and a distribution unit 495 as illustrated in FIG. 22.

The viewing acceptance unit 490 accepts a video viewing request from a user.

In response to the viewing request, the distribution unit 495 distributes, as video information, information about an image and audio to an information processing terminal of the user.

Figure 23:
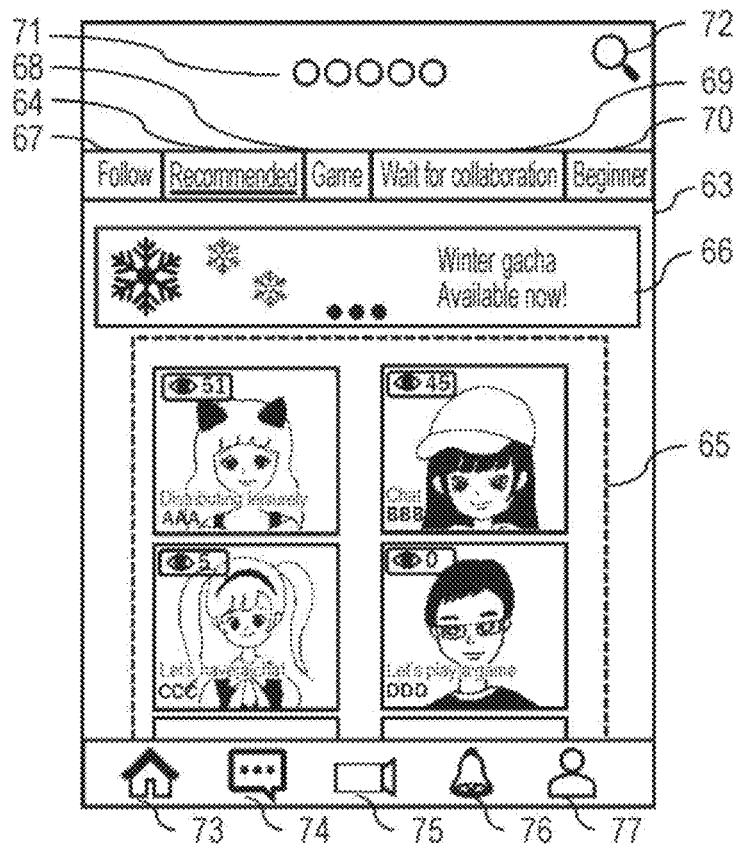
FIG. 23 is a conceptual diagram illustrating a screen displayed on a user terminal.

FIG. 23 illustrates a top screen 63 displayed on a user terminal when a video distribution/viewing application has been started.

As illustrated in FIG. 23, the user selects one distribution channel (distribution frame, distribution program, distribution video) from among thumbnail images of one or more recommended distribution channels 65 displayed in a list view in a recommended tab 64 on the top screen 63, thereby being able to view the video reproduced in the one distribution channel.

Alternatively, the user accesses a fixed link of one specific distribution channel, thereby being able to view the video reproduced in the one specific distribution channel. The fixed link may be obtained from a notification from a distribution user that the user follows, or a sharing notification received from another user.

In this way, the user who views a video is a viewer user, and the terminal for viewing the video is the viewer user terminal 2200.

As illustrated in FIG. 23, a notification display field 66 for a campaign or event may be displayed on the top screen 63. In the notification display field 66, the notification can be switched to another notification by a slide operation.

On the top screen 63, a follow tab 67 for moving to the above-described screen illustrated in FIGS. 12 and 18, a game tab 68 for displaying game categories, a wait for collaboration tab 69 for displaying a distribution channel waiting for collaboration, and a beginner tab 70 for displaying distribution channels for beginners are displayed. Selecting of one of these tabs (switching between tabs) makes it possible to move to another screen from the top screen 63.

A service name indicator 71 and a search button 72 in an upper frame of the top screen 63 may be kept displayed on the screen displayed after transition.

Also, a home button 73, a message button 74, a distribution preparation button 75, a notification button 76, and a profile button 77 in a lower frame of the top screen 63 may be kept displayed on the screen displayed after transition.

A user who has selected a thumbnail image displayed on the top screen 63 or the like illustrated in FIG. 23 may become a viewer user who views a video, whereas a user who has selected the distribution preparation button 75 may become a distributor user who distributes an avatar video.

For example, upon the distribution preparation button 75 being selected on the top screen 63 illustrated in FIG. 23, the screen changes to the avatar setting screen 40 illustrated in FIG. 19. Upon the distribution button 41 being selected on the avatar setting screen 40, the screen changes to the distribution setting screen 44 illustrated in FIG. 20. Upon the distribution start button 49 being selected on the distribution setting screen 44, the screen changes to the avatar distribution screen 50 illustrated in FIG. 21.

Upon one thumbnail image being selected on the top screen 63 illustrated in FIG. 23, the screen changes to a video viewing screen.

Figure 24:
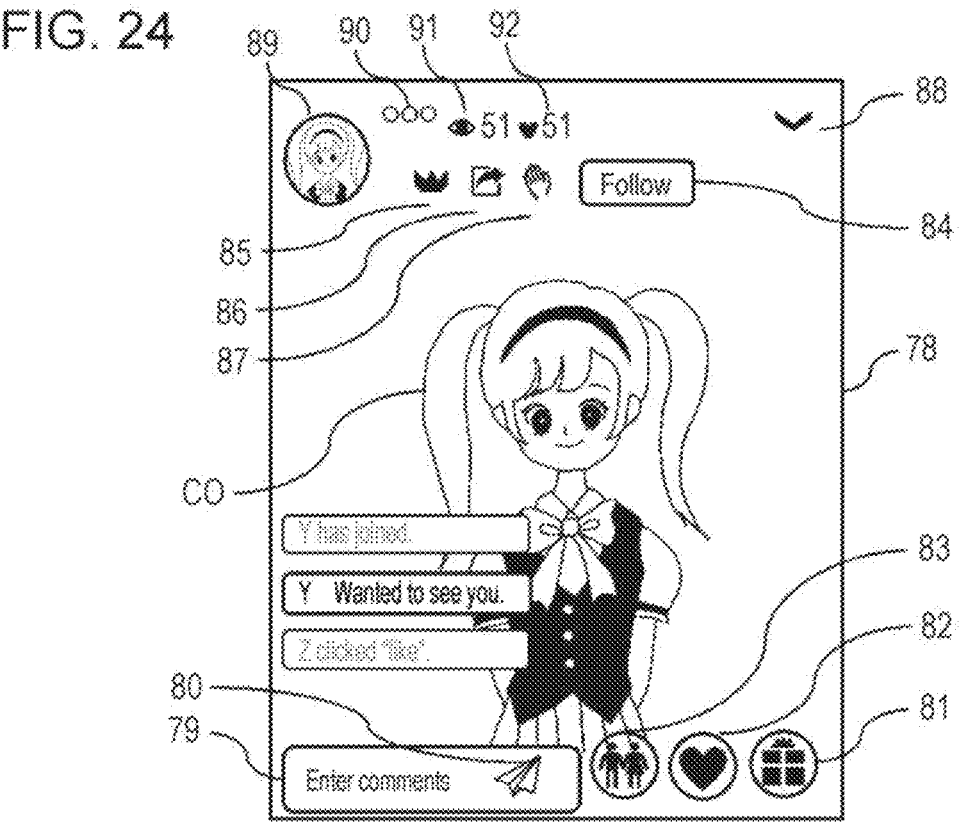
FIG. 24 is a conceptual diagram illustrating a screen displayed on a user terminal.

FIG. 24 illustrates an example of a viewing screen 78 for an avatar video displayed on the viewer user terminal 2200.

The viewer user inputs text to a comment field 79 and presses a send button 80, thereby being able to post a comment.

Upon pressing of a gift button 81, a gift list (FIG. 25) is displayed to the viewer user, and a request for displaying a designated gift may be transmitted by selecting the gift.

In this case, the one or more computer processors according to the embodiment of the present disclosure may include a determination unit. The determination unit determines whether a gift display request has been received from the viewer user terminal 2200.

The gift display request may include gift object information. The gift object information includes at least gift object identification information identifying the type of gift object and position information indicating the position at which the gift object is to be displayed.

Figure 25:
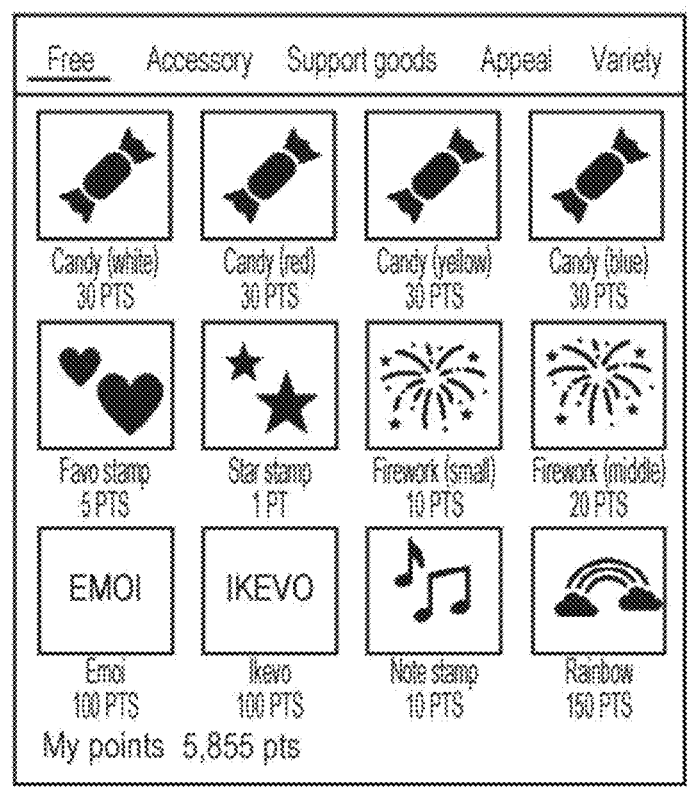
FIG. 25 is a conceptual diagram illustrating a screen displayed on a user terminal.

As illustrated in FIG. 25, the gifts may be displayed by being categorized (free or pay gifts, accessories, support goods, appeal, variety, etc.).

A pay gift is a gift that is purchasable by consuming my coin purchased by the viewer user, and a free gift is a gift obtainable by consuming or without consuming my points obtained free by the viewer user.

The viewer user is able to post an evaluation indicating favor by pressing a like button 82.

If a distributor user has made a distribution setting of allowing another user to appear in a video, an application to appear in the video may be transmitted by selecting a collaboration application button 83.

On a screen of a video distributed by a distributor user who has not yet been followed by a viewer user, a follow button 84 for following the distributor user by a viewer user is displayed. This follow button functions as a follow cancel button on a screen of a video distributed by a distributor user who has already been followed by a viewer user.

The "follow" may be performed from a viewer user to a viewer user, from a distributor user to a viewer user, or from a distributor user to a distributor user. However, "follow" is managed as association in only one direction, and association in the opposite direction is separately managed as a follower.

A support ranking button 85, a sharing button 86, and an invitation button 87 are also displayed on the viewing screen 78.

The support ranking indicates the ranking of a viewer user supporting a distributor users. The ranking may be calculated in accordance with the amount of gifts (points/coins).

Regarding sharing of a video, a viewer user is able to press the sharing button 86 to check a list of social networking services (SNSs) in which a video can be shared, and transmit a fixed link to a designated site of an SNS designated by selection.

The invitation button 87 is for inviting the second user to a video that is being viewed, like the first object in the embodiment of the present disclosure. Selecting of the button makes it possible to display a list screen for inviting a mutually followed user.

Figure 26:
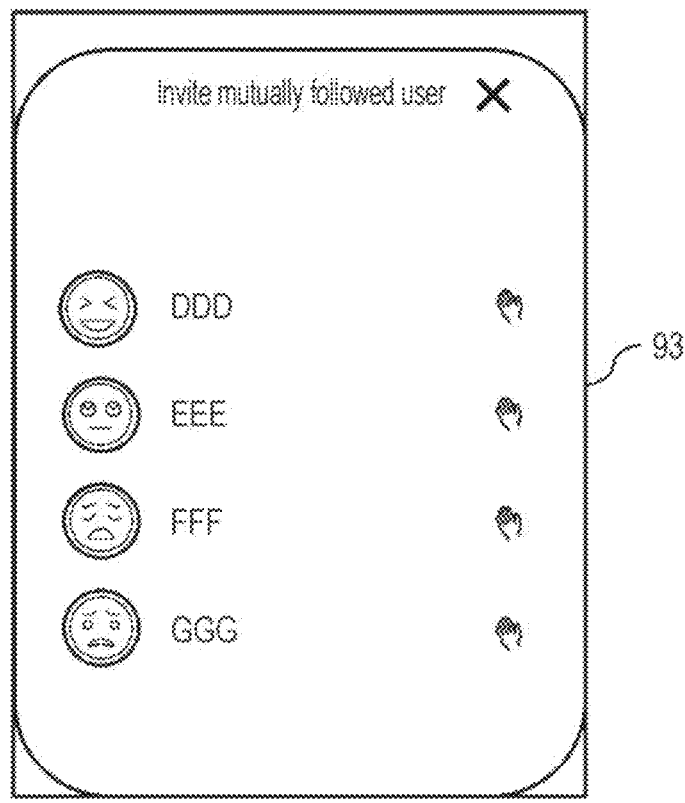
FIG. 26 is a conceptual diagram illustrating a screen displayed on a user terminal.

FIG. 26 illustrates an example of a list screen 93 for inviting a mutually followed user. On the list screen 93, a first object may be displayed together with an image and/or a name indicating the profile of each of one or more second users having a specific relationship with the first user. Upon the first object being selected, an invitation notification is transmitted to the second user.

With pressing of the collaboration application button 83, a collaboration distribution may be requested to a distributor user. Collaboration distribution is allowing a character object of a viewer user to appear in a video distributed by a distributor user.

A distributor user icon 89, a distributor user name (character object name) 90, a total-number-of-viewers indicator 91, and a total-number-of-likes indicator 92 may be displayed at an upper portion of the viewing screen 78.

Upon a viewing end button 88 being selected, a screen for ending viewing is displayed, so that a viewing end request can be transmitted.

The screen for ending viewing will be described in detail. A state in which the screen is displayed is referred to as "audio small-window distribution", which is for performing viewing by reproducing only audio without displaying a video image.

Selection of the viewing end button 88 is accepted as a video viewing end request by the viewing acceptance unit 490.

At this time, the distribution unit 495 ends distributing information about an image in response to the viewing end request, but does not end distributing information about audio.

When information about an image and audio is being distributed in a user terminal, the image is displayed on a main screen in the user terminal. When only information about audio is being distributed, no image is displayed on the user terminal, and a sub-screen indicating that a video is being viewed is displayed.

Figure 27:
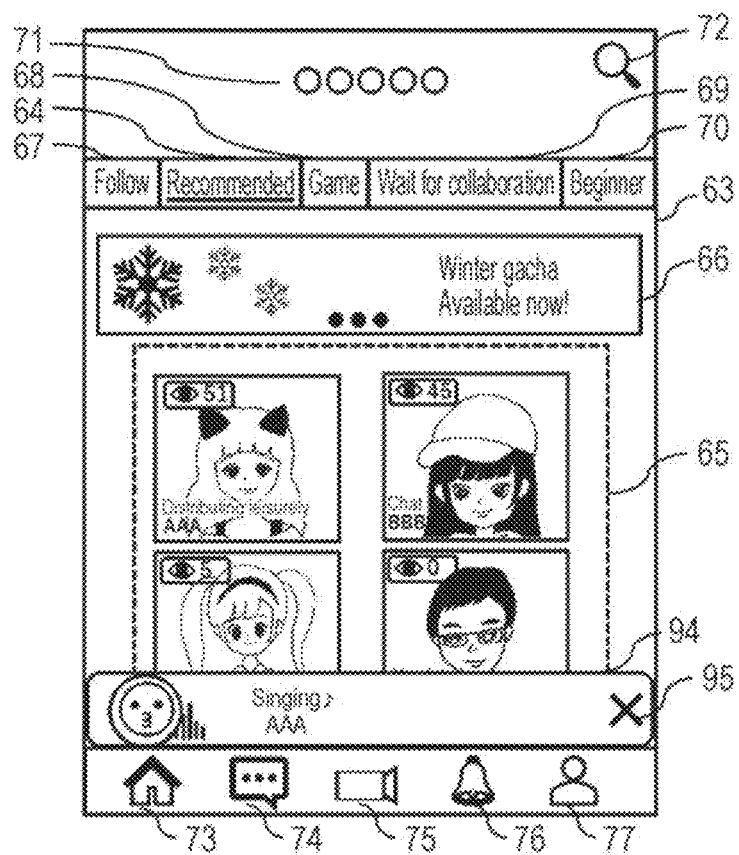
FIG. 27 is a conceptual diagram illustrating a screen displayed on a user terminal.

FIG. 27 illustrates a screen on which a sub-screen 94 mentioned above is displayed.

When the sub-screen 94 is displayed, the main screen displayed on the background changes to the screen that is displayed before viewing a video. For example, in a case where change from the recommended tab to the viewing frame occurs, the screen returns to the screen of the recommended tab. In a case where change from the follow tab to the viewing frame occurs, the screen returns to the screen of the follow tab.

When the sub-screen 94 is displayed, an operation on the main screen can be performed, and changing to another screen can be performed. Thus, a state in which the first user causes the sub-screen 94 to be displayed is not determined to be the second state but is determined to be the third state.

The sub-screen 94 displays a profile image, a name, a title, and an audio icon visually indicating that audio is being reproduced.

Selecting of an end icon 95 displayed on the sub-screen 94 makes it possible to completely end the viewing.

At the time of ending display of an image, information may be transmitted from the server apparatus but not be displayed on the terminal, or transmission of information from the server apparatus may be stopped.

With this configuration, a user is able to search for another video distribution while listening to audio or enjoy a chat with another user.

Next, a description will be given of "collaboration" in which another user appears in a video of a distributor user.

As described above, a viewer user is able to transmit a participation request for participating in the video via a confirmation screen of a collaboration distribution participation request that is displayed by pressing the collaboration application button 83 illustrated in FIG. 24.

In response to the participation request accepted by the accepting unit, an avatar display unit displays in the video a character object generated based on motion of the viewer user who has made the participation request.

Figure 28:
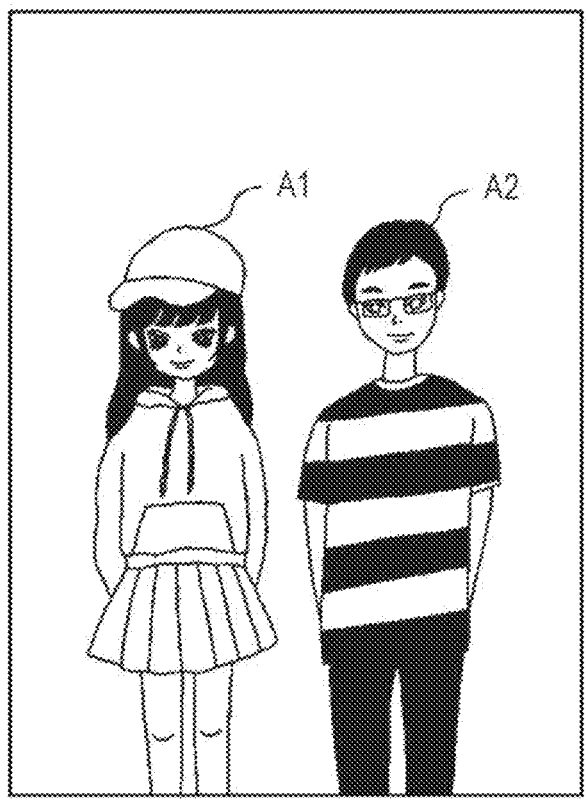
FIG. 28 is a conceptual diagram illustrating a screen displayed on a user terminal.

FIG. 28 illustrates, as an example, a screen in which a second avatar A2 as a character object of a guest user is participating in a video including a first avatar A1 as a character object of a host user. In FIG. 28, display of objects other than the avatars is omitted.

Figure 29:
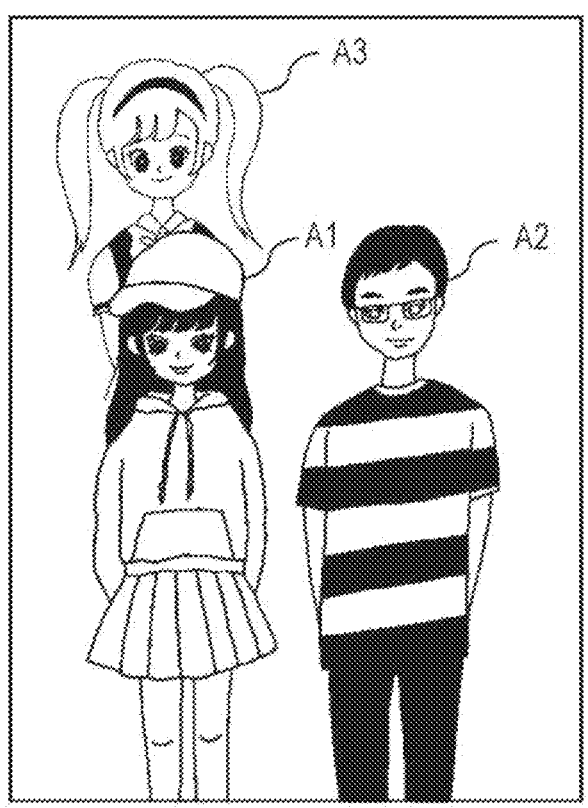
FIG. 29 is a conceptual diagram illustrating a screen displayed on a user terminal.

As illustrated in FIG. 29, a third avatar A3 as a character object generated based on motion of another viewer user may further participate in the video. Although the third avatar A3 is located behind the first avatar A1 and the second avatar A2 in FIG. 29, the three avatars may be arranged side by side in one row. The positions of the avatars may be designated by the distributor user.

With the above-described configuration, it is possible to provide technical improvements for solving or addressing at least part of the above-described issue of the related art. Specifically, it is possible to provide an information processing system capable of increasing a distributer's willingness to distribute and/or increasing a viewer's willingness to view.

Next, an information processing method according to an embodiment of the present disclosure will be described.

Figure 3:
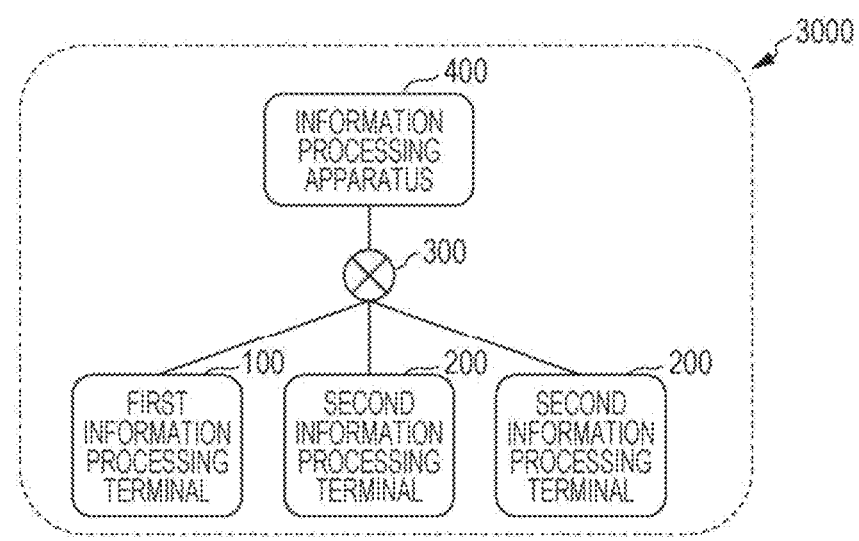
FIG. 3 is a system configuration diagram illustrating an example of an information processing system according to an embodiment of the present disclosure.

The information processing method according to the embodiment of the present disclosure is an information processing method for the information processing system 3000 that distributes a video as illustrated in FIG. 3. The information processing system 3000 includes the first information processing terminal 100, the second information processing terminals 200, and the information processing apparatus 400 (server apparatus 400).

Figure 30:
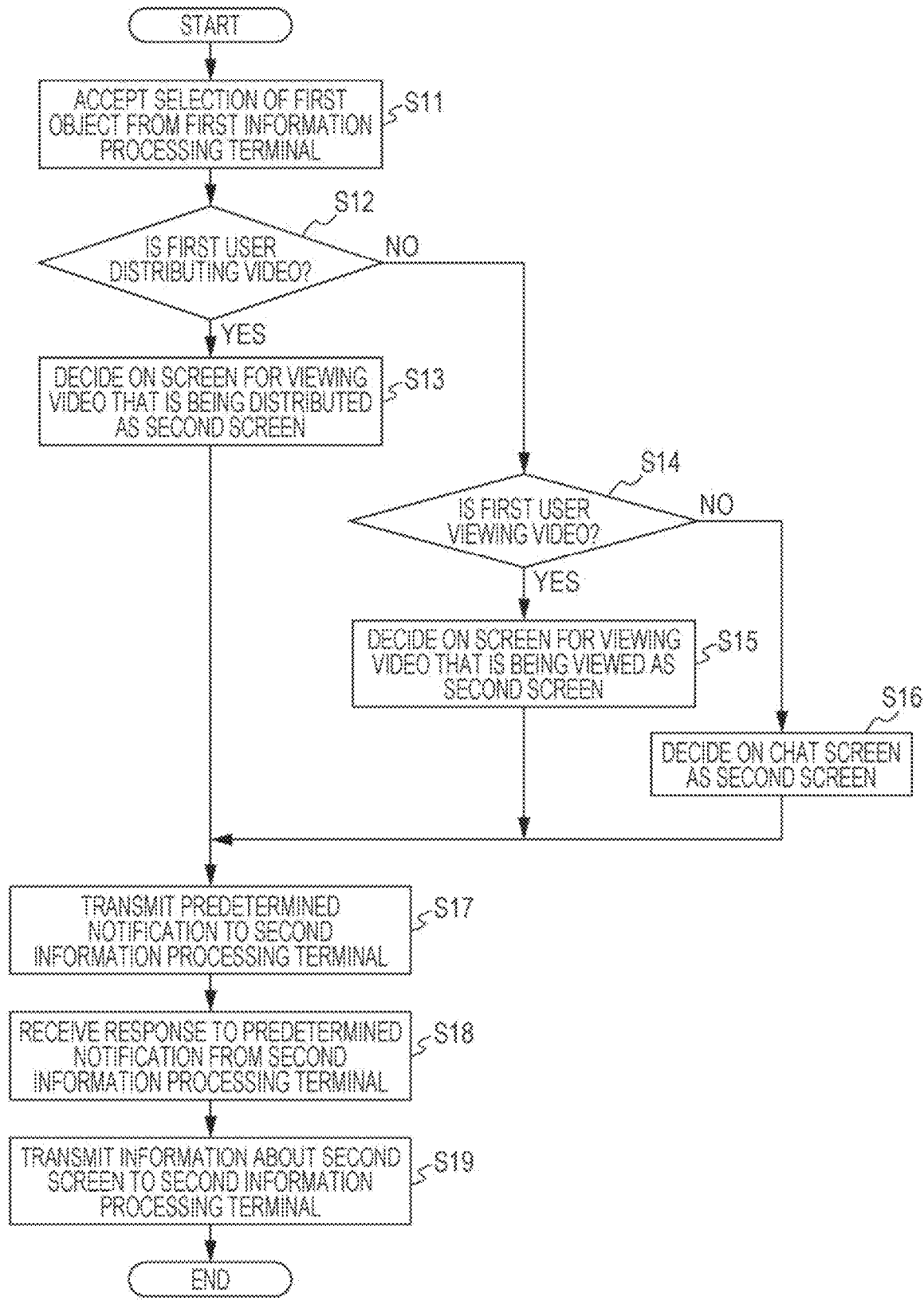
FIG. 30 is a flowchart illustrating an example of a process of an information processing method according to an embodiment of the present disclosure.

As illustrated as an example in FIG. 30, the information processing method according to the embodiment of the present disclosure causes the one or more computer processors included in the information processing system to execute an acceptance step S11, a transmission step S17, a reception step S18, first determination steps S12 and S14, and decision steps S13, S15, and S16.

The acceptance step S11 accepts selection of a first object from the first information processing terminal. The acceptance step S11 may be executed by the above-described acceptance unit 410.

The transmission step S17 transmits, in accordance with the selection accepted in the acceptance step S11, a predetermined notification to the second information processing terminal associated with the first object. The transmission step S17 may be executed by the above-described transmission unit 420.

The reception step S18 receives a response to the predetermined notification from the second information processing terminal. The reception step S18 may be executed by the above-described reception unit 430.

The first determination steps S12 and S14 determine a state of the first user related to the first information processing terminal. The first determination steps S12 and S14 may be executed by the above-described first determination unit 440.

The decision steps S13, S15, and S16 decide on the second screen to be displayed on the second information processing terminal in accordance with a result of the first determination step. The decision steps S13, S15 and S16 may be executed by the above-described decision unit 450.

Although FIG. 30 illustrates an example in which the first determination steps S12 and S14 and the decision steps S13, S15, and S16 are executed before the transmission step S17, these steps may be executed after the reception step S18.

With the above-described configuration, it is possible to provide technical improvements for solving or addressing at least part of the above-described issue of the related art.

Next, a computer program according to an embodiment of the present disclosure will be described.

The computer program according to the embodiment of the present disclosure is a computer program executed by the information processing system 3000 that distributes a video as illustrated in FIG. 3. The information processing system 3000 includes the first information processing terminal 100, the second information processing terminals 200, and the information processing apparatus 400 (server apparatus 400).

The computer program according to the embodiment of the present disclosure causes the one or more computer processors included in the information processing system to implement an acceptance function, a transmission function, a reception function, a first determination function, and a decision function.

The acceptance function accepts selection of a first object from the first information processing terminal.

The transmission function transmits a predetermined notification to the second information processing terminal associated with the first object in accordance with the selection accepted by the acceptance function.

The reception function receives a response to the predetermined notification from the second information processing terminal.

The first determination function determines a state of the first user related to the first information processing terminal.

The decision function decides on a second screen to be displayed on the second information processing terminal in accordance with a determination result of the first determination function.

Figure 31:
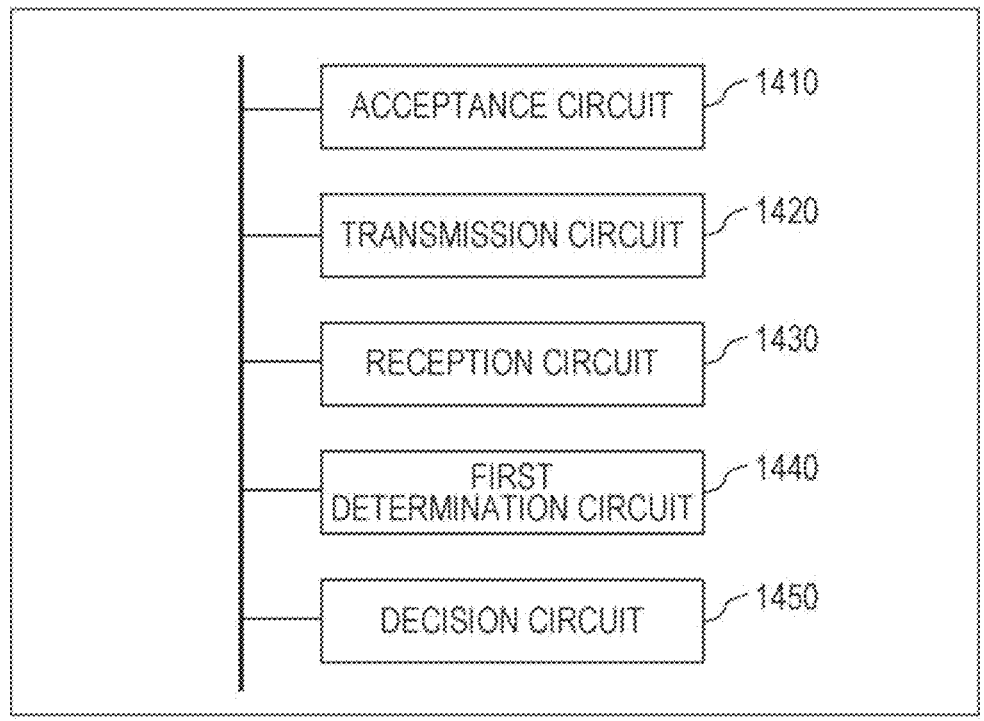
FIG. 31 is a circuit configuration diagram illustrating an example of a circuit configuration for implementing a computer program according to an embodiment of the present disclosure.

The foregoing functions may be implemented by an acceptance circuit 1410, a transmission circuit 1420, a reception circuit 1430, a first determination circuit 1440, and a decision circuit 1450 illustrated in FIG. 31. The acceptance circuit 1410, the transmission circuit 1420, the reception circuit 1430, the first determination circuit 1440, and the decision circuit 1450 are implemented by the acceptance unit 410, the transmission unit 420, the reception unit 430, the first determination unit 440, and the decision unit 450 described above, respectively. The details of the individual units are as described above.

With the above-described configuration, it is possible to provide technical improvements for solving or addressing at least part of the above-described issue of the related art.

Next, a first information processing terminal according to an embodiment of the present disclosure will be described.

The first information processing terminal 100 according to the embodiment of the present disclosure is included in the information processing system 3000 that distributes a video as illustrated in FIG. 3. The information processing system 3000 may further include the second information processing terminals 200 and the information processing apparatus 400 (server apparatus 400).

Figure 32A:
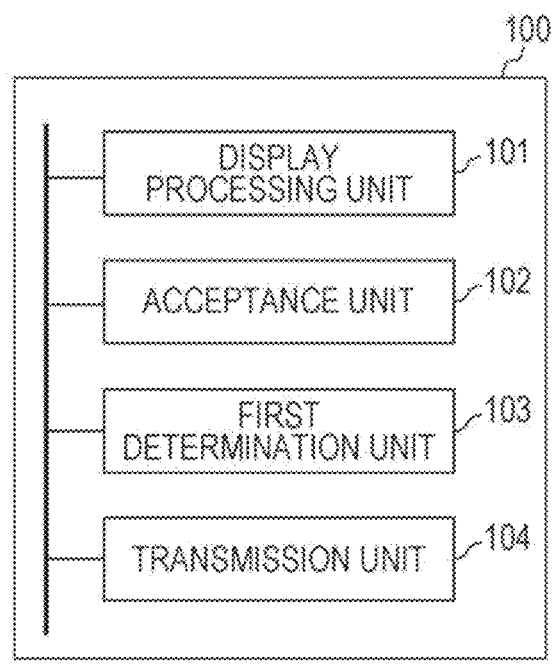
FIG. 32A is a configuration diagram illustrating an example of a functional configuration of a first information processing terminal according to an embodiment of the present disclosure.

The first information processing terminal 100 includes a display processing unit 101, an acceptance unit 102, a first determination unit 103, and a transmission unit 104, as illustrated in FIG. 32A.

The display processing unit 101 causes a first object to be displayed on a screen.

The acceptance unit 102 accepts selection of the first object displayed by the display processing unit 101.

The first determination unit 103 determines a state of a first user related to the first information processing terminal.

The transmission unit 104 transmits the selection accepted by the acceptance unit 102 and a determination result of the first determination unit 103 to the server apparatus.

With the above-described configuration, it is possible to provide technical improvements for solving or addressing at least part of the above-described issue of the related art.

Next, a computer program for a distributor user terminal according to an embodiment of the present disclosure will be described.

The computer program according to the embodiment of the present disclosure is a computer program executed by the first information processing terminal 100 included in the information processing system 3000 that distributes a video as illustrated in FIG. 3. The information processing system 3000 may further include the second information processing terminals 200 and the information processing apparatus 400 (server apparatus 400).

The computer program causes the one or more computer processors included in the first information processing terminal 100 to implement a display processing function, an acceptance function, a first determination function, and a transmission function.

The display processing function causes a first object to be displayed on a screen.

The acceptance function accepts selection of the first object displayed by the display processing function.

The first determination function determines a state of a first user related to the first information processing terminal.

The transmission function transmits the selection accepted by the acceptance function and a determination result of the first determination function to the server apparatus.

Figure 32B:
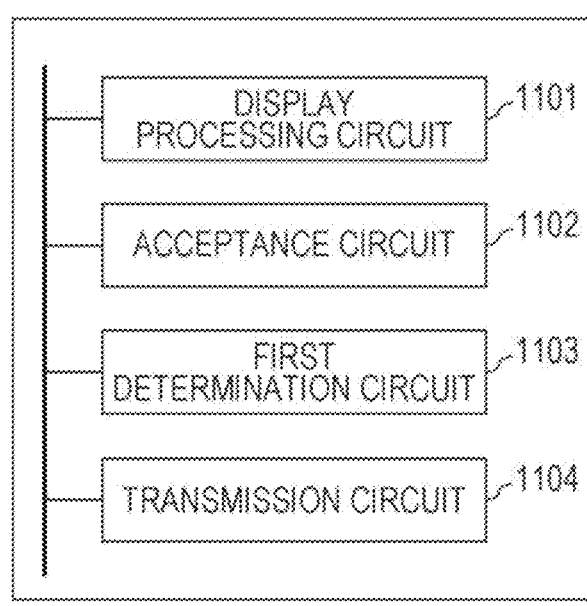
FIG. 32B is a circuit configuration diagram illustrating an example of a circuit configuration for implementing functions of a program for the first information processing terminal according to an embodiment of the present disclosure.

The foregoing functions may be implemented by a display processing circuit 1101, an acceptance circuit 1102, a first determination circuit 1103, and a transmission circuit 1104 illustrated in FIG. 32B. The display processing circuit 1101, the acceptance circuit 1102, the first determination circuit 1103, and the transmission circuit 1104 are implemented by the display processing unit 101, the acceptance unit 102, the first determination unit 103, and the transmission unit 104 described above, respectively. The details of the individual units are as described above.

With the above-described configuration, it is possible to provide technical improvements for solving or addressing at least part of the above-described issue of the related art.

Next, an information processing method for a first information processing terminal according to an embodiment of the present disclosure will be described.

The information processing method according to the embodiment of the present disclosure is an information processing method for the first information processing terminal 100 included in the information processing system 3000 that distributes a video as illustrated in FIG. 3. The information processing system may further include the second information processing terminals 200 and the information processing apparatus 400 (server apparatus 400).

The information processing method according to the embodiment of the present disclosure causes the one or more computer processors included in the first information processing terminal 100 to execute a display processing step S21, an acceptance step S22, first determination steps S23 and S25, and transmission steps S24, S26, and S27, as illustrated as an example in FIG. 33.

The display processing step S21 causes a first object to be displayed on a screen. The display processing step S21 may be executed by the above-described display processing unit 101.

The acceptance step S22 accepts selection of the first object displayed in the display processing step S21. The acceptance step S22 may be executed by the above-described acceptance unit 102.

The first determination steps S23 and S25 determine a state of a first user related to the first information processing terminal. The first determination steps S23 and S25 may be executed by the above-described first determination unit 103.

The transmission steps S24, S26, and S27 transmit the selection accepted in the acceptance step S22 and a determination result of the first determination steps to the server apparatus. The transmission steps S24, S26, and S27 may be executed by the above-described transmission unit 104.

With the above-described configuration, it is possible to provide technical improvements for solving or addressing at least part of the above-described issue of the related art.

Next, a second information processing terminal according to an embodiment of the present disclosure will be described.

The second information processing terminal 200 according to the embodiment of the present disclosure is included in the information processing system 3000 that distributes a video as illustrated in FIG. 3. The information processing system 3000 may further include the first information processing terminal 100 and the information processing apparatus 400 (server apparatus 400).

Figure 34A:
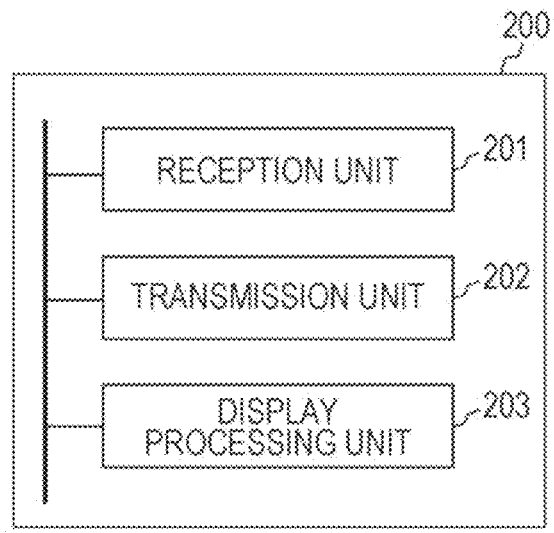
FIG. 34A is a configuration diagram illustrating an example of a functional configuration of a second information processing terminal according to an embodiment of the present disclosure.

The second information processing terminal 200 includes a reception unit 201, a transmission unit 202, and a display processing unit 203, as illustrated in FIG. 34A.

The reception unit 201 receives a predetermined notification transmitted by the server apparatus in accordance with selection of a first object in the first information processing terminal 100.

The transmission unit 202 transmits a response to the predetermined notification received by the reception unit 201 to the server apparatus.

The display processing unit 203 causes a second screen to be displayed based on information about the second screen received from the server apparatus.

The second screen is decided on based on a state of a first user related to the first information processing terminal 100.

With the above-described configuration, it is possible to provide technical improvements for solving or addressing at least part of the above-described issue of the related art.

Next, a computer program for a second information processing terminal according to an embodiment of the present disclosure will be described.

The computer program according to the embodiment of the present disclosure is a computer program executed by the second information processing terminal 200 included in the information processing system 3000 that distributes a video as illustrated in FIG. 3. The information processing system 3000 may further include the first information processing terminal 100 and the information processing apparatus 400 (server apparatus 400).

The computer program causes the one or more computer processors included in the second information processing terminal 200 to implement a reception function, a transmission function, and a display processing function.

The reception function receives a predetermined notification transmitted by the server apparatus in accordance with selection of a first object in the first information processing terminal 100.

The transmission function transmits a response to the predetermined notification received by the reception function to the server apparatus.

The display processing function causes a second screen to be displayed based on information about a second screen received from the server apparatus.

The second screen is decided on based on a state of a first user related to the first information processing terminal.

Figure 34B:
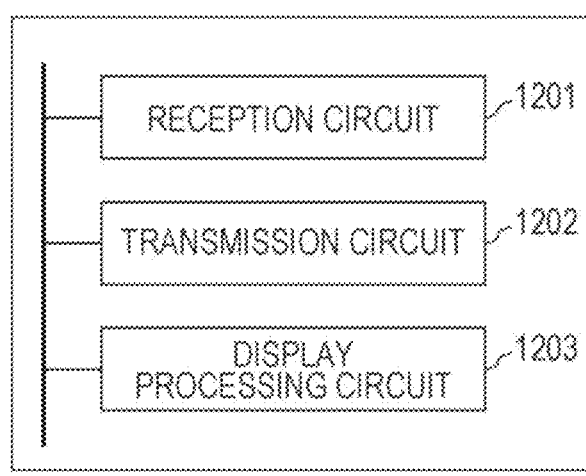
FIG. 34B is a circuit configuration diagram illustrating an example of a circuit configuration for implementing functions of a program for the second information processing terminal according to an embodiment of the present disclosure.

The foregoing functions may be implemented by a reception circuit 1201, a transmission circuit 1202, and a display processing circuit 1203 illustrated in FIG. 34B. The reception circuit 1201, the transmission circuit 1202, and the display processing circuit 1203 are implemented by the reception unit 201, the transmission unit 202, and the display processing unit 203 described above, respectively. The details of the individual units are as described above.

With the above-described configuration, it is possible to provide technical improvements for solving or addressing at least part of the above-described issue of the related art.

Next, an information processing method for the second information processing terminal 200 according to an embodiment of the present disclosure will be described.

The information processing method according to the embodiment of the present disclosure is an information processing method for the second information processing terminal 200 included in the information processing system 3000 that distributes a video as illustrated in FIG. 3. The information processing system 3000 may further include the first information processing terminal 100 and the information processing apparatus 400 (server apparatus 400).

Figure 35:
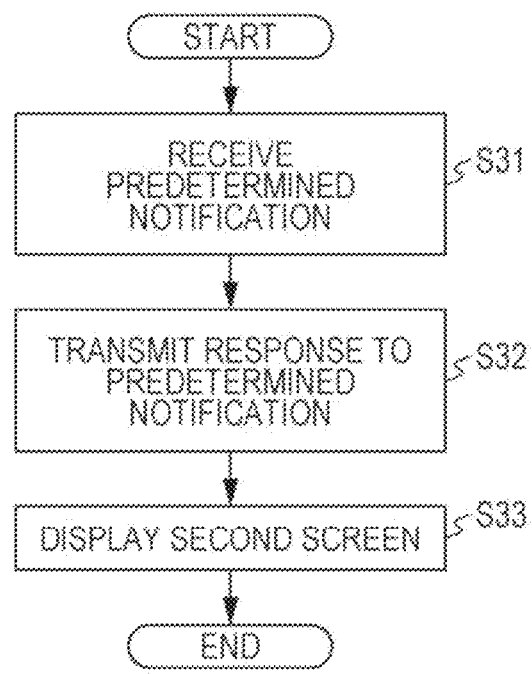
FIG. 35 is a flowchart illustrating an example of a process of an information processing method for the second information processing terminal according to an embodiment of the present disclosure.

The information processing method according to the embodiment of the present disclosure causes the one or more computer processors included in the second information processing terminal to implement a reception step S31, a transmission step S32, and a display processing step S33, as illustrated in FIG. 35.

The reception step S31 receives a predetermined notification transmitted from the server apparatus in accordance with selection of a first object in the first information processing terminal.

The transmission step S32 transmits a response to the predetermined notification received in the reception step to the server apparatus.

The display processing step S33 causes a second screen to be displayed based on information about the second screen received from the server apparatus.

The second screen is decided on based on a state of a first user related to the first information processing terminal.

With the above-described configuration, it is possible to provide technical improvements for solving or addressing at least part of the above-described issue of the related art.

An information processing apparatus such as a computer or a mobile phone may preferably be caused to function as a server apparatus or a terminal apparatus according to the above-described embodiments. Such an information processing apparatus can be implemented by storing, in a storage unit of the information processing apparatus, a program describing processing for implementing individual functions of the server apparatus or the terminal apparatus according to the embodiments, and reading and executing the program by a CPU of the information processing apparatus.

The embodiments of the present disclosure described above are merely examples and are not intended to limit the scope of the disclosure. These novel embodiments can be carried out in other various forms, and various omissions, replacements, or changes can be made without deviating from the gist of the disclosure. The embodiments and modifications thereof are included in the gist and scope of the disclosure, and are also included in the disclosure of the claims and the equivalents thereof.

The methods described in the embodiments may be distributed as a program executable by a computer, by storing the program in a recording medium or transmitting the program via a communication medium. Examples of the recording medium include a magnetic disk (a floppy disk, a hard disk, or the like), an optical disc (a CD-ROM, a DVD, an MO, or the like), and a semiconductor memory (a ROM, a RAM, a flash memory, or the like). The program stored in a medium includes a setting program for constituting software means (including not only an execution program but also a table and data structure) to be executed by a computer in the computer. The computer that implements the apparatus reads the program recorded on the recording medium, constructs software means by using the setting program as appropriate, and executes the above-described processing with operations being controlled by the software means. The recording medium in this specification is not limited to a medium to be distributed, and includes a storage medium such as a magnetic disk or a semiconductor memory provided in the computer or an apparatus connected via a network. The storage unit may function as, for example, a main storage device, an auxiliary storage device, or a cache memory.

The term "gift" used in the present application has a concept similar to that of the term "token". Thus, the term "gift" may be replaced with the term "token" to understand the technique described in the present application.

All the objects transmitted and received in the information processing system according to the embodiment of the present disclosure, such as a "gift" and a "comment" described above, are electronic "data".

A communication line for implementing the above-described network may include and is not limited to a mobile phone network, a wireless network (for example, RF connection via Bluetooth, Wi-Fi (such as IEEE 802.11a/b/n), WiMax, cellular, satellite, laser, or infrared rays), a fixed-line phone network, the Internet, an intranet, a local area network (LAN), a wide area network (WAN), and/or an Ethernet network.

The above-described memory may include and is not limited to a computer-readable medium, such as a volatile memory (for example, a register, a cache, or a random access memory (RAM)), a nonvolatile memory (for example, a read-only memory (ROM), an electrically erasable programmable read-only memory (EEPROM), or a flash memory), and storage (for example, a hard disk drive (HDD), a solid state drive (SSD), magnetic tape, or an optical medium). As will be easily understood, the term "computer-readable recording medium" may include, not a transmission medium such as a modulated data signal or a transitory signal, but a medium for data storage such as a memory and storage.

This specification is described in the sense of various representative embodiments that are not intended to be limited in any way. A singular form used in the present application, such as "one", "the", "foregoing", "said", "aforementioned", "this", or "that", may include a plural form unless it is explicitly indicated that the singular form does not include a plural form. The term "include" may mean "comprise" or "have". Furthermore, the term "coupled", "coupling", "linked", "linking", "connected", or "connecting" includes mechanical, electrical, magnetic, and optical methods for coupling, linking, or connecting objects to each other, together with other methods, and does not exclude the presence of an intermediate element between the objects coupled to, coupling to, linked to, linking to, connected to, or connecting to each other.

The various systems, methods, and apparatuses described in this specification are not to be interpreted as being limited in any way. The present disclosure is actually directed to all novel features and aspects in each of the disclosed various embodiments, a combination of these various embodiments, and a combination of some of these various embodiments. The various systems, methods, and apparatuses described in this specification are not limited to a specific aspect, a specific feature, or a combination of the specific aspect and the specific feature. The things and methods described in this specification are not required to have one or more specific advantages or to solve issues. Furthermore, various features or aspects, or some of the various features or aspects in the various embodiments described in this specification may be used in combination with each other.

Although operations of some of the various methods disclosed in this specification are described in a specific order for convenience, it is to be understood that such a description includes changing of the order of the operations unless a specific order is defined by a specific sentence. For example, a plurality of operations described in order may be executed in a different order or may be executed simultaneously in some cases. For the purpose of simplification, the attached drawings do not illustrate various methods in which various items and methods described in this specification may be used together with other items and methods. In addition, this specification may use the terms "generate", "create", "display", "receive", "evaluate", and "distribute". These terms are high-level descriptions of various operations that are actually executed. The various actual operations corresponding to these terms may change depending on specific implementation, and may be easily recognized by a person skilled in the art who has a benefit of the disclosure of this specification.

An operation theory, a scientific principle, or other theoretical descriptions presented in this specification in association with the apparatuses or methods of the embodiments of the present disclosure are provided for the purpose of better understanding, and are not intended to limit the technical scope. The apparatus and methods in the appended claims are not limited to an apparatus and methods that operate using the methods described based on such an operation theory.

All the various methods disclosed in this specification may be implemented by using a plurality of computer-executable instructions stored in one or more computer-readable media (for example, one or more non-transitory computer-readable storage media, such as one or more optical medium discs, a plurality of volatile memory components, or a plurality of nonvolatile memory components), and may be executed by a computer. The plurality of volatile memory components include, for example, a dynamic random access memory (DRAM) or a static random access memory (SRAM). The plurality of nonvolatile memory components include, for example, a hard disk drive (HDD) and a solid state drive (SSD). Furthermore, the computer includes, for example, any commercially available computer including a smartphone and another mobile apparatus having hardware that performs computation.

All the plurality of computer-executable instructions for implementing the technique disclosed in this specification may be stored in one or more computer-readable media (for example, non-transitory computer-readable storage media) together with any data that is to be generated and used during implementation of the various embodiments disclosed in this specification. The plurality of computer-executable instructions may be, for example, part of an individual software application, or part of a software application accessed or downloaded via a web browser or another software application (such as a remote computation application). Such software may be executed in, for example, a single local computer (for example, as an agent executed in any preferred commercially-available computer), or a network environment (for example, the Internet, a wide area network, a local area network, a client server network (such as a cloud computation network), or another similar network) by using one or more network computers.

For clarification, only various specific aspects selected from among various software-based implementations are described. Other details that are known in the related field are omitted. For example, the technique disclosed in this specification is not limited to a specific computer language or program. For example, the technique disclosed in this specification may be executed by software described in C, C++, Java, or another preferred programming language. Also, the technique disclosed in this specification is not limited to a specific computer or a specific type of hardware. Specific details of a preferred computer and hardware are known and need not be described in detail in this specification.

Furthermore, all the various software-based embodiments (including, for example, the plurality of computer-executable instructions for causing a computer to execute any of the various methods disclosed in this specification) may be uploaded, downloaded, or remotely accessed by preferred communication means. The preferred communication means includes, for example, the Internet, the World Wide Web, an intranet, a software application, a cable (including an optical fiber cable), magnetic communication, electromagnetic communication (including RF communication, microwave communication, and infrared communication), electronic communication, or another similar communication means.

What is claimed is:

1. An information processing system that distributes a video, the information processing system comprising
processing circuitry configured to
accept selection of a first object from a first information processing terminal;
transmit, in accordance with the selection, a predetermined notification to a second information processing terminal associated with the first object;
receive a response to the predetermined notification from the second information processing terminal;
determine a state of a first screen displayed on the first information processing terminal, the state being one of:
a first state of appearing in the video,
a second state of viewing the video on a main screen, and a third state of neither appearing in the video nor viewing the video on the main screen; and decide, based on the determined state of the first screen, a second screen to be displayed on the second information processing terminal, wherein in a case that the processing circuitry determines that the state is the second state, the processing circuitry decides, as the second screen to be displayed on the second information processing terminal, a screen for viewing the video at the second information processing terminal simultaneously with the video being viewed at the first information processing terminal.

2. The information processing system according to claim 1, wherein in a case that the processing circuitry determines that the state is the first state, the processing circuitry decides, as the second screen to be displayed on the second information processing terminal, a screen for viewing the video in which a first user of the first information processing terminal is appearing.

3. The information processing system according to claim 1, wherein in a case that the processing circuitry determines that the state is the third state, the processing circuitry decides, as the second screen to be displayed on the second information processing terminal, a screen for exchanging messages with a first user of the first information processing terminal.

4. The information processing system according to claim 1, wherein the processing circuitry is further configured to control a display to display the first object within an online notification indicating that a second user related to the second information processing terminal has entered an online state.

5. The information processing system according to claim 1, wherein the processing circuitry is further configured to control a display to display the first object within a list screen listing one or more second users having a specific relationship with a first user of the first information processing terminal.

6. The information processing system according to claim 1, wherein the processing circuitry determines the state of the first display screen at a timing at which the processing circuitry accepts the selection.

7. The information processing system according to claim 1, wherein the processing circuitry determines the state of the first screen at a timing at which the processing circuitry receives the response.

8. The information processing system according to claim 5, wherein the processing circuitry is further configured to determine a user state of each of the one or more second users having the specific relationship with the first user.

9. The information processing system according to claim 8, wherein the user state of each of the one or more second users is determined by the processing circuitry is one of:
a fourth state of appearing in a video,
a fifth state of viewing a video, and
a sixth state of neither appearing in a video nor viewing a video.

10. The information processing system according to claim 9, wherein the sixth state includes any of:
a seventh state of neither appearing in a video nor viewing a video but being in an online state, and
an eighth state of being in an offline state.

11. The information processing system according to claim 9, wherein the processing circuitry controls the display to display the first object in association with only a second user determined to be in the fifth state among the one or more second users.

12. The information processing system according to claim 10, wherein
in a case that a state of a second user related to the second information processing terminal is the sixth state, the processing circuitry further determines which of the seventh state and the eighth state the state of the second user is, and
the processing circuitry varies a type of the predetermined notification in accordance with which of the seventh state and the eighth state the state of the second user is.

13. The information processing system according to claim 8, wherein the processing circuitry controls the display to display, on the list screen, the user state of each of the one or more second users having the specific relationship with the first user such that the state is identifiable, together with an image and/or a name indicating a profile of each of the one or more second users.

14. The information processing system according to claim 1, wherein the predetermined notification indicates the number of times the first object has been selected by an operation of the first information processing terminal, such that the number of times is confirmable.

15. An information processing method for an information processing system that distributes a video, the information processing method comprising:
accepting a selection of a first object from a first information processing terminal;
transmitting; in accordance with the selection, a predetermined notification to a second information processing terminal associated with the first object;
receiving a response to the predetermined notification from the second information processing terminal;
determining a state of a first screen displayed on the first information processing terminal, the state being one or more of:
a first state of appearing in the video,
a second state of viewing the video on a main screen, and
a third state of neither appearing in the video nor viewing the video on the main screen; and
deciding, based on the determined state of the first screen, a second screen to be displayed on the second information processing terminal, wherein
in a case that the determining indicates that the state is the second state, the deciding includes deciding, as the second screen to be displayed on the second information processing terminal, a screen for viewing the video at the second information processing terminal simultaneously with the video being viewed at the first information processing terminal.

16. An information processing method for a first information processing terminal included in an information processing system that distributes a video and includes the first information processing terminal, a second information processing terminal and a server apparatus, the information processing method comprising:
controlling a display to display a first object on a screen;
accepting a selection of the first object displayed on the display;
determining a state of a first screen displayed on the first information processing terminal, the state being one or more of:
a first state of appearing in the video,
a second state of viewing the video on a main screen, and
a third state of neither appearing in the video nor viewing the video on the main screen;

transmitting the selection and the determined state to the server apparatus and in a case that the determining indicates that the state is the second state, viewing the video simultaneously with the video being viewed at the second information processing terminal.

17. An information processing method for a second information processing terminal included in an information processing system that distributes a video and includes a first information processing terminal, the second information processing terminal and a server apparatus, the information processing method comprising:

receiving a predetermined notification from the server apparatus in accordance with a selection of a first object in the first information processing terminal;

transmitting, to the server apparatus, a response to the predetermined notification; and controlling a display to display a second screen based on information about the second screen received from the server apparatus, wherein the second screen is decided based on a state of a first screen displayed on the first information processing terminal, the state being one of:

a first state of appearing in the video, a second state of viewing the video on a main screen, and a third state of neither appearing in the video nor viewing the video on the main screen, and in a case that the state is the second state, the second screen is displayed for viewing the video simultaneously with the video being viewed at the first information processing terminal.

\* \* \* \* \*